US009943459B2

United States Patent
Roy et al.

(10) Patent No.: US 9,943,459 B2
(45) Date of Patent: Apr. 17, 2018

(54) METHOD AND APPARATUS FOR PROVIDING DEFICIT-ADJUSTED ADAPTIVE ASSISTANCE DURING MOVEMENT PHASES OF AN IMPAIRED JOINT

(71) Applicants: The University of Maryland, Baltimore, Baltimore, MD (US); The United States of America as represented by the Department of Veterans Affairs, Washington, DC (US)

(72) Inventors: Anindo Roy, Baltimore, MD (US); Larry W. Forrester, Washington, DC (US); Richard F. Macko, Ellicott City, MD (US)

(73) Assignees: University of Maryland, Baltimore, Baltimore, MD (US); The United States of America as Represented by the Department of Veterans Affairs, Washington, DC (US)

( * ) Notice: Subject to any disclaimer, the term of this patent is extended or adjusted under 35 U.S.C. 154(b) by 385 days.

(21) Appl. No.: 14/549,370

(22) Filed: Nov. 20, 2014

(65) Prior Publication Data

US 2015/0141878 A1 May 21, 2015

Related U.S. Application Data

(60) Provisional application No. 61/906,453, filed on Nov. 20, 2013.

(51) Int. Cl.
*A61H 3/00* (2006.01)
*A61H 1/02* (2006.01)
*B25J 9/16* (2006.01)

(52) U.S. Cl.
CPC .................. *A61H 3/00* (2013.01); *A61H 1/02* (2013.01); *A61H 1/024* (2013.01); *A61H 1/0266* (2013.01);
(Continued)

(58) Field of Classification Search
CPC ........ A61H 1/02; A61H 1/024; A61H 1/0266; A61H 1/0262; A61H 3/00; A61F 2/68;
(Continued)

(56) References Cited

U.S. PATENT DOCUMENTS 6,666,831 B1 * 12/2003 Edgerton ............. A61H 1/0237
600/587
7,313,463 B2 * 12/2007 Herr ..................... B62D 57/032
318/568.1

(Continued)

OTHER PUBLICATIONS

Iqbal et al., "Stabilizing PID Controllers for a Single-Link Biomechanical Model with Position, Velocity, and Force Feedback", Journal of Biomechanical Engineering, vol. 126, Dec. 2004, pp. 838-843, http://www.ncbi.nlm.nih.gov/pubmed/15796343.

(Continued)

*Primary Examiner* — Steven Douglas
*Assistant Examiner* — Kathrynn Lyddane
(74) *Attorney, Agent, or Firm* — Eugene J. Molinelli; Beusse Wolter Sanks & Maire

(57) ABSTRACT

A method includes determining, on a processor, a current movement phase for a compound joint function based on sensor data. The method further includes determining, on the processor, a respective robot state parameter trace for each movement phase in a normal and impaired subject. The method further includes determining, on the processor, a deficit parameter for each movement phase. The method further includes determining, on the processor, an adaptive magnitude for the robot applied torque based on the deficit parameter of the current movement phase. The method
(Continued)

further includes applying, to the robot joint, the adaptive magnitude for the robot applied torque for the current movement phase, based on an adaptive timing for the current movement phase. An apparatus is also described for providing deficit-adjusted adaptive assistance during movement phases of the impaired joint.

20 Claims, 22 Drawing Sheets

(52) U.S. Cl.
CPC ..... *B25J 9/1615* (2013.01); *A61H 2201/1215* (2013.01); *A61H 2201/149* (2013.01); *A61H 2201/165* (2013.01); *A61H 2201/1676* (2013.01); *A61H 2201/5002* (2013.01); *A61H 2201/5007* (2013.01); *A61H 2201/5069* (2013.01); *A61H 2201/5097* (2013.01); *G05B 2219/39332* (2013.01); *G05B 2219/40305* (2013.01); *G05B 2219/45108* (2013.01)

(58) Field of Classification Search
CPC ........... G05B 2219/39332; G05B 2219/40305; G05B 2219/45108; B25J 9/1615; B25J 9/0006; B25J 9/1628
See application file for complete search history.

(56) References Cited

U.S. PATENT DOCUMENTS

| | | | |
|---|---|---|---|
| 7,578,799 B2 * | 8/2009 | Thorsteinsson | A61B 5/1038 602/16 |
| 8,147,436 B2 | 4/2012 | Agrawal et al. | |
| 8,206,267 B2 | 6/2012 | Holden et al. | |
| 8,366,591 B2 | 2/2013 | Patoglu | |
| 8,808,214 B2 | 8/2014 | Herr et al. | |
| 9,198,821 B2 | 12/2015 | Unluhisarcikli et al. | |
| 2003/0093021 A1 | 5/2003 | Goffer | |
| 2007/0010378 A1 | 1/2007 | Katoh et al. | |
| 2013/0197408 A1 | 8/2013 | Goldfarb et al. | |
| 2014/0024981 A1 * | 1/2014 | Chun | A61H 1/00 601/69 |

OTHER PUBLICATIONS

Roy et al., "Robot-Aided Neurorehabilitation: A Novel Robot for Ankle Rehabilitation", IEEE Transactions on Robotics, vol. 25, No. 3, Jun. 2009, pp. 569-582, http://ieeexplore.ieee.org/xpl/login.jsp?tp=&arnumber=4909072&url=http%3A%2F%2Fieeexplore.ieee.org%2Fxpls%2Fabs_all.jsp%3Farnumber%3D4909072.

Roy et al., "Measurement of Passive Ankle Stiffness in Subjects with Chronic Hemiparesis using a Novel Ankle Robot", J Neurophysiol 105:2132-2149, 2011, Feb. 23, 201, pp. 2132-2149, http://www.ncbi.nlm.nih.gov/pubmed/21346215.

Forrester, L.W., "Ankle Training With a Robotic Device Improves Hemiparetic Gait After a Stroke," Neurorehabilitation and Neural Repair, 2011, pp. 369-377, vol. 25, No. 4.

Hidler, J., et al., "Multicenter Randomized Clinical Trial Evaluating the Effectiveness of the Lokomat in Subacute Stroke," Neurorehabilitation and Neural Repair, 2009, pp. 5-13, vol. 23, No. 1.

Roy, A., et al. "Robot-Aided Neurorehabilitation: A Novel Robot for Ankle Rehabilitation," IEEE Transactions on Robotics, 2009, pp. 569-582, vol. 25, No. 3.

Roy, A., et al., "Anklebot-Assisted Locomotor Training After Stroke: A Novel Deficit-Adjusted Control Approach," 2013 IEEE International Conference on Robotics and Automation, May 6-10, 2013, pp. 2175-2182.

* cited by examiner

METHOD AND APPARATUS FOR PROVIDING DEFICIT-ADJUSTED ADAPTIVE ASSISTANCE DURING MOVEMENT PHASES OF AN IMPAIRED JOINT

CROSS-REFERENCE TO RELATED APPLICATIONS

This application claims benefit of Provisional Appln. 61/906,453, filed Nov. 20, 2013, the entire contents of which are hereby incorporated by reference as if fully set forth herein, under 35 U.S.C. § 119(e).

STATEMENT OF GOVERNMENTAL INTEREST

This invention was made with government support under Contract No. B3688R and 1-101-RX000351-01 awarded by the Department of Veteran Affairs Rehabilitation Research and Development Service. The government has certain rights in the invention.

BACKGROUND

When a patient suffers a medical condition, such as a stroke, that affects the patient's ability to move one or more joints, the patient routinely undergoes physical rehabilitation, in an effort to recover mobility and control of the joint. In one form of conventional physical rehabilitation, a therapist pushes or slides the patient's joint through a plurality of movement phases of a movement cycle. To reduce tedium and variability of such physical therapy, exoskeletal robots have been introduced. A conventional form of such physical rehabilitation involves the use of the exoskeletal robot that is attached to the impaired joint, to impose prescribed dynamics of a healthy joint on the impaired joint, over a plurality of movement phases.

SUMMARY

It is here recognized that conventional methods of physical rehabilitation for patients with impaired joints are deficient, since they employ exoskeletal robots which impose prescribed dynamics of a healthy joint, which are at a normal speed, onto the impaired joint of the patient, who may be moving at a reduced speed. This mismatch between the imposed dynamics of a healthy joint on the impaired joint results in out-of-sync dynamics between the robot and the patient in which movement of the impaired joint is inhibited rather than assisted by the robot.

In a first set of embodiments, a method is provided for providing deficit-adjusted adaptive assistance during a plurality of movement phases of an impaired joint. The method includes receiving, on a processor, sensor data that indicates sensor state as a function of time based on movement of a joint of a subject. The method further includes determining, on the processor, a current movement phase of the plurality of movement phases for a compound joint function of the joint based on the sensor data. The method further includes receiving, on the processor, robot state parameter data that indicates a robot state parameter of an exo-skeletal robot joint as a function of time. The method further includes determining, on the processor, a robot state parameter trace for each movement phase in a normal subject, based on the robot state parameter data and the sensor data from the normal subject. The method further includes determining, on the processor, a robot state parameter trace for each movement phase in an impaired subject, based on the robot state parameter data and the sensor data from the impaired subject. The method further includes determining, on the processor, a deficit parameter for each movement phase, based on a difference between the robot state parameter trace for the normal subject and the robot state parameter trace for the impaired subject at different phases. The method further includes determining, on the processor, an adaptive timing for a robot applied torque based on a current movement phase based on a current sensor state, from current sensor data. The method further includes determining, on the processor, an adaptive magnitude for the robot applied torque based on the deficit robot state parameter of the current movement phase. The method further includes applying, to the exo-skeletal robot joint, the adaptive magnitude for the robot applied torque for the current movement phase, based on the adaptive timing.

In a second set of embodiments, an apparatus is provided for providing deficit-adjusted adaptive assistance during a plurality of movement phases of an impaired joint. The apparatus includes a first sensor with a plurality of states based on a respective plurality of movement phases of a compound joint function. The apparatus further includes a robot state parameter sensor configured to measure a respective robot state parameter of an exo-skeletal robot joint during each movement phase. The apparatus further includes a processor in communication with the first sensor to receive the plurality of states and to the robot state parameter sensor to receive the respective robot state parameter of the subject. The memory includes one or more sequence of instructions. The memory and the sequence of instructions are configured to, with the processor, cause the apparatus to determine a deficit parameter for each movement phase based on the respective robot state parameter applied to the exo-skeletal robot joint by a normal subject and by an impaired subject. The memory and sequence of instructions are further configured to cause the apparatus to determine an adaptive timing for a robot applied torque based on a current movement phase based on a current state of the first sensor. The memory and sequence of instructions are further configured to cause the apparatus to determine an adaptive magnitude for the robot applied torque based on the deficit robot state parameter for the current movement phase. The memory and sequence of instructions are further configured to cause the apparatus to apply to the exo-skeletal robot joint, the adaptive magnitude for the robot applied torque for the current movement phase, based on the adaptive timing.

In a third set of embodiments, a computer-readable medium is provided carrying sequences of instructions, where execution of the sequences of instructions by a processor causes the processor to receive sensor data that indicates sensor state as a function of time based on movement of a joint of a subject. Additionally, execution of the sequences of instructions causes the processor to determine a current movement phase of a plurality of movement phases for a compound joint function of the joint based on the sensor data. Additionally, execution of the sequences of instructions causes the processor to receive robot state parameter data that indicates a robot state parameter of an exo-skeletal robot joint as a function of time. Additionally, execution of the sequences of instructions causes the processor to determine a robot state parameter trace for each movement phase in a normal subject based on the robot state parameter data and the sensor data from the normal subject. Additionally, execution of the sequences of instructions causes the processor to determine a robot state parameter trace for each movement phase in an impaired subject, based on the robot state parameter data and the sensor data from the impaired subject. Additionally, execution of the sequences of instructions causes the processor to determine a deficit parameter for each movement phase based on a difference between the robot state parameter trace for the normal subject and the robot state parameter trace for the impaired subject. Additionally, execution of the sequences of instructions causes the processor to determine an adaptive timing for a robot applied torque based on a current movement phase based on a current sensor state from current sensor data. Additionally, execution of the sequences of instructions causes the processor to determine an adaptive magnitude for the robot applied torque based on the deficit robot state parameter of the current movement phase. Additionally, execution of the sequences of instructions causes the processor to apply the adaptive magnitude for the robot applied torque for the current movement phase based on the adaptive timing.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
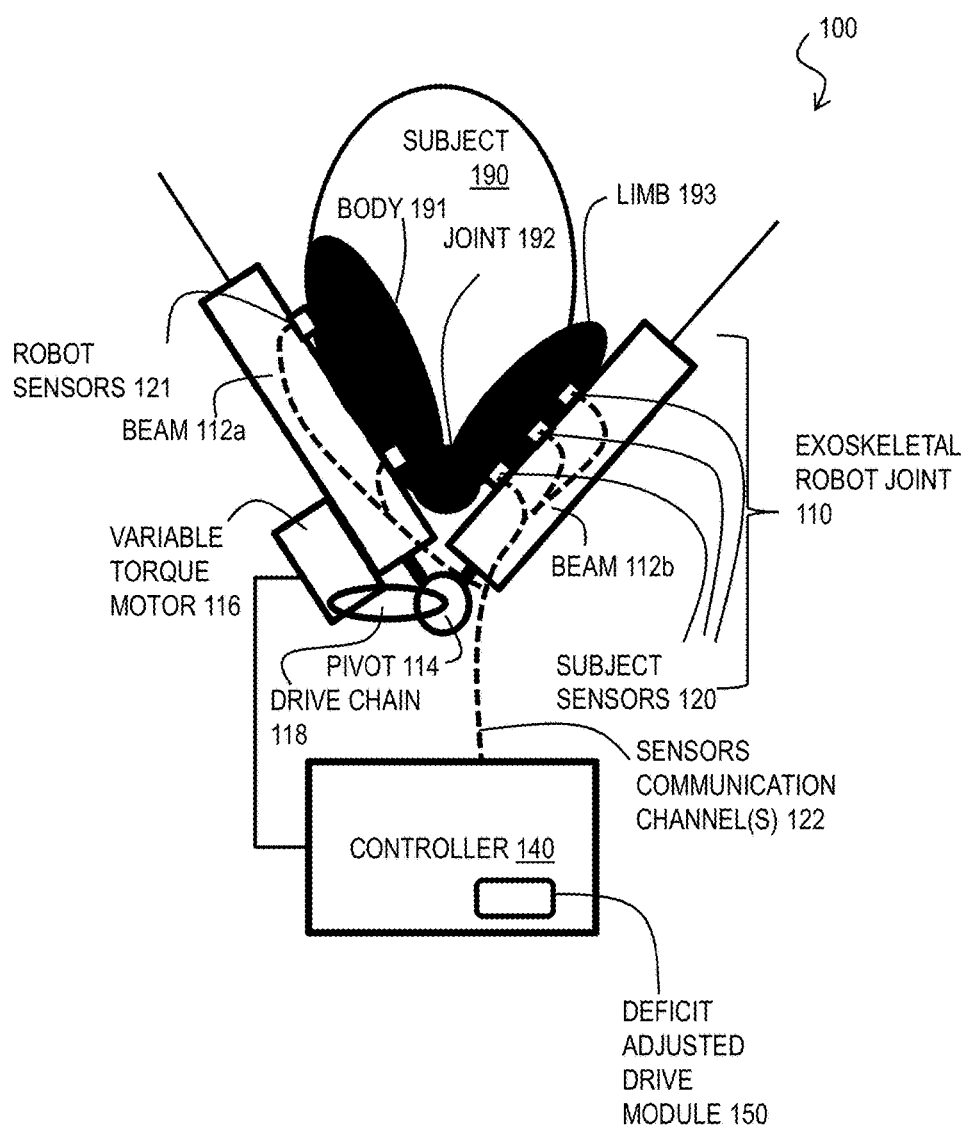
FIG. 1A is a block diagram that illustrates an example system for providing deficit-adjusted adaptive assistance during a plurality of movement phases of an impaired joint, according to an embodiment.

A method and apparatus are described for providing deficit-adjusted adaptive assistance during a plurality of movement phases of an impaired joint. For purposes of the following description, an impaired joint is defined as any joint of the human body experiencing impaired movement, due to an injury or medical condition sustained by the patient. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of providing deficit-adjusted adaptive assistance over a plurality of movement phases during training of an impaired joint, such as an ankle joint, a hip joint, or a knee joint. However, the invention is not limited to this context. In other embodiments, deficit-adjusted adaptive assistance is provided over a plurality of movement phases during training or strengthening of a healthy joint. In other embodiments, methods or apparatus is provided to utilize modular robotics in diverse neurological populations for rehabilitation of impaired joints to improve mobility function. Applications of this embodiment encompass different neurological diseases and different joints, as described in more detail in later sections.

Some embodiments are utilized in the context of amputation prostheses that is designed to replace lost limbs in a patient, to help the patient recover mobility and sensory function. Some embodiments are used in the context of regulating foot pressure and ground reaction forces for dealing with diabetic neuropathy. Some embodiments are utilized in the context of motor learning to improve outcomes for podiatry, orthopedics, and prosthetics. Some embodiments are utilized in the context of improving walking and balancing function after a patient experiences a stroke, by means of increasing contribution of a paretic (e.g. affected) ankle. Some embodiments are used in the context of Multiple Sclerosis (MS) and Parkinson's disease.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

1. Overview

When a patient suffers an injury or medical condition that affects one or more of their joints, the patient's ability to move and control the joint is impaired. For example, the patient may not be able to move the joint at a torque that was previously achievable prior to the injury or medical condition. Additionally, the patient may not be able to move the joint through a range of motion, at a speed or at an orientation that was previously achievable prior to the injury or medical condition. According to various embodiments, sensors are provided to measure these parameters of movement of the impaired joint, in order to determine an adaptive magnitude or timing of assistance, or some combination, for the impaired joint during treatment.

When a joint is moved through a range of motion, this range of motion includes a plurality of movement phases. When a patient suffers an injury or medical condition which affects the mobility of one or more joints, this impaired joint may be affected during one or more of these movement phases and in the timing of those movement phases. For example, a patient with an impaired joint may only experience impaired movement of the joint during a first movement phase of the joint and be capable of normal movement of the joint during the remaining movement phases, however the timing of those movement phases may be slowed. According to various embodiments, sensors are provided to detect when a joint is in each of the impaired movement phases, in order to determine an adaptive timing of assistance for the impaired joint during treatment. In various embodiments, the magnitude of the deficit is determined during each movement phase in order to determine an adaptive magnitude for assistance during each movement phase.

FIG. 1A is a block diagram that illustrates an example system 100 for providing deficit-adjusted adaptive assistance over a plurality of movement phases during training of an impaired joint 192, according to one embodiment. The impaired joint 192 may be any joint connecting a limb 193 to a body 191 of a subject 190, where the subject 190 has limited mobility of the impaired joint 192, due to a sustained injury or medical condition. During a compound function of the joint 192, the impaired joint 192 moves through a plurality of movement phases. Although a subject 190 with body part 191, joint 192 and limb 193 is depicted for purpose of illustration, the subject 190 is not part of the system 100. The system 100 includes an exoskeletal joint 110, subject sensors 120 and controller 140 configured with a deficit adjusted drive module 150.

The exoskeletal joint 110 includes a pivot 114 connecting a pair of beams 112a, 112b respectively secured to the body 191 and limb 193 on either side of the subject's joint 192. The exoskeletal joint 110 also includes a variable torque motor 116 that imparts torque on the pivot 114 (e.g., through a drive chain 118). In some embodiments, the exoskeletal robot joint 110 also includes one or more robot sensors 121 to determine non-torque state of the robot 110, such as a sensor for the angle between beams 112a and 112b.

Figure 19:
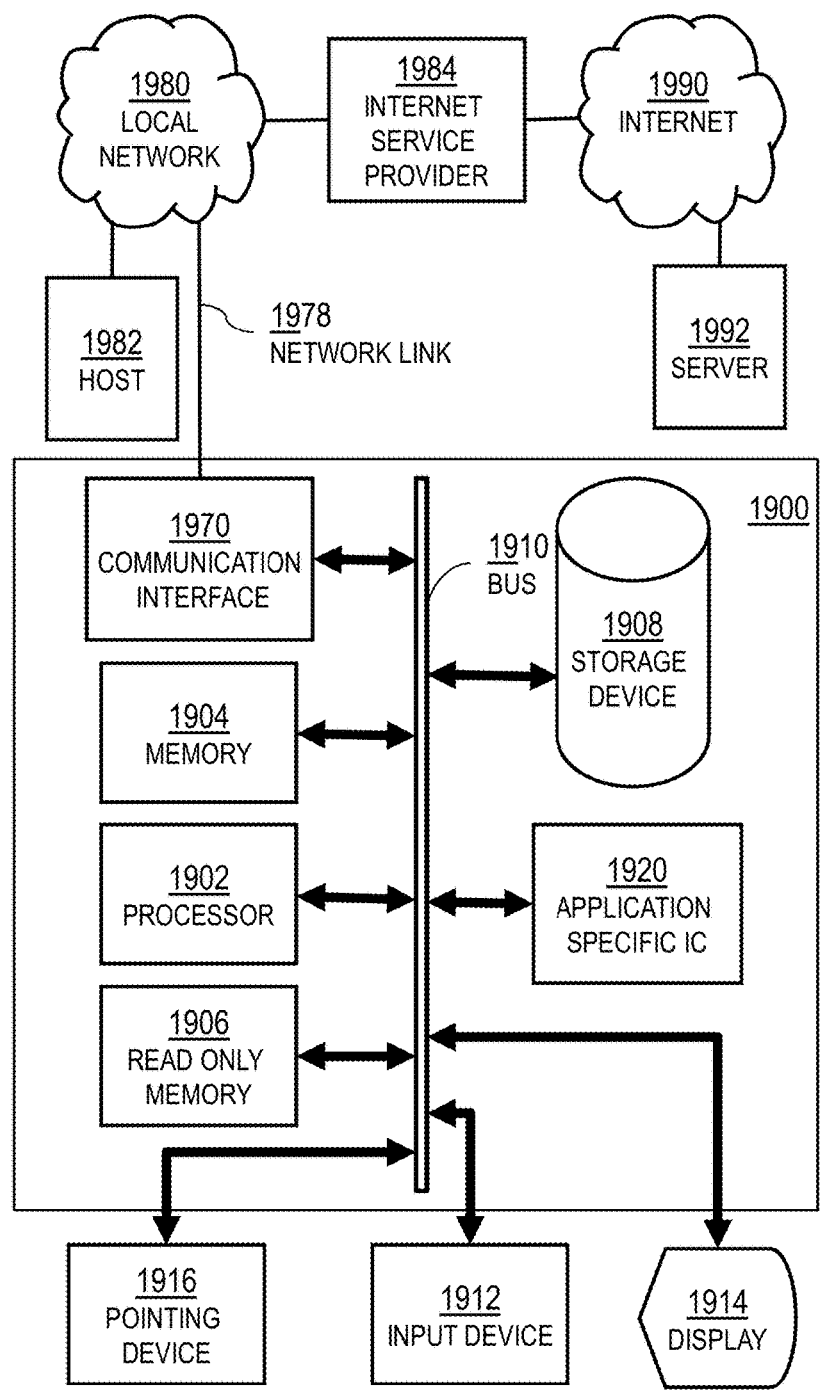
FIG. 19 is a block diagram that illustrates a computer system upon which an embodiment of the invention may be implemented.
Figure 20:
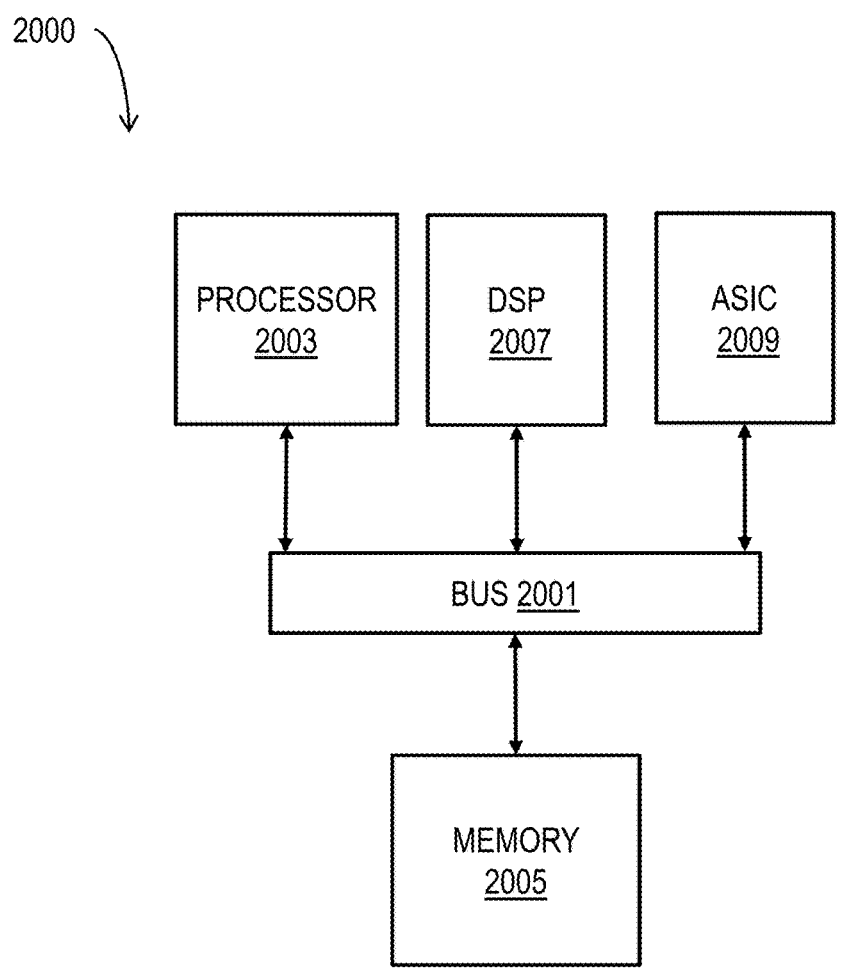
FIG. 20 is a block diagram that illustrates a chip set upon which an embodiment of the invention may be implemented.

The subject sensors 120 (also called sensors 120, for convenience) output a plurality of states, where at least some outputted state indicates a respective movement phase of the impaired joint 192. In one embodiment, the sensors 120 output a first state when the impaired joint 192 is in a first movement phase and output a second state when the impaired joint 192 is in a second movement phase. When not being driven, the variable torque motor 116 also outputs a current or voltage that responds to a torque applied by the subject 190 to the pivot 114 while the subject is connected to (e.g., wearing) the exoskeletal robot joint 110, in some embodiments. In some embodiments, the current or voltage output by the motor 116 is used as a torque sensor to measure a torque applied by external forces, such as that applied by movement of the subject's joint 192 during each movement phase. In some embodiments, position data is inferred from the torque measurements from the motor 116. In some embodiments, one or more of the additional robot sensors 121 measures position data, such as velocity and/or angle of the joint 192 during each movement phase. As further illustrated in FIG. 1A, the controller 140 drives the torque motor 116, and receives robot state parameter data that is based on the current or voltage output by the torque motor 116 or the position or angle data output by the additional robot sensors 121 when the beams 112a, 112b are moved by external forces, or some combination, and is connected to the sensors 120 and 121, along wired or wireless sensor communication channels 122. In various embodiments, the controller 140 comprises a general purpose computer system, as depicted in FIG. 19 or a chip set as depicted in FIG. 20, and instructions to cause the computer or chip set to perform one or more steps of a method described below with reference to FIG. 2.

Figure 1B:
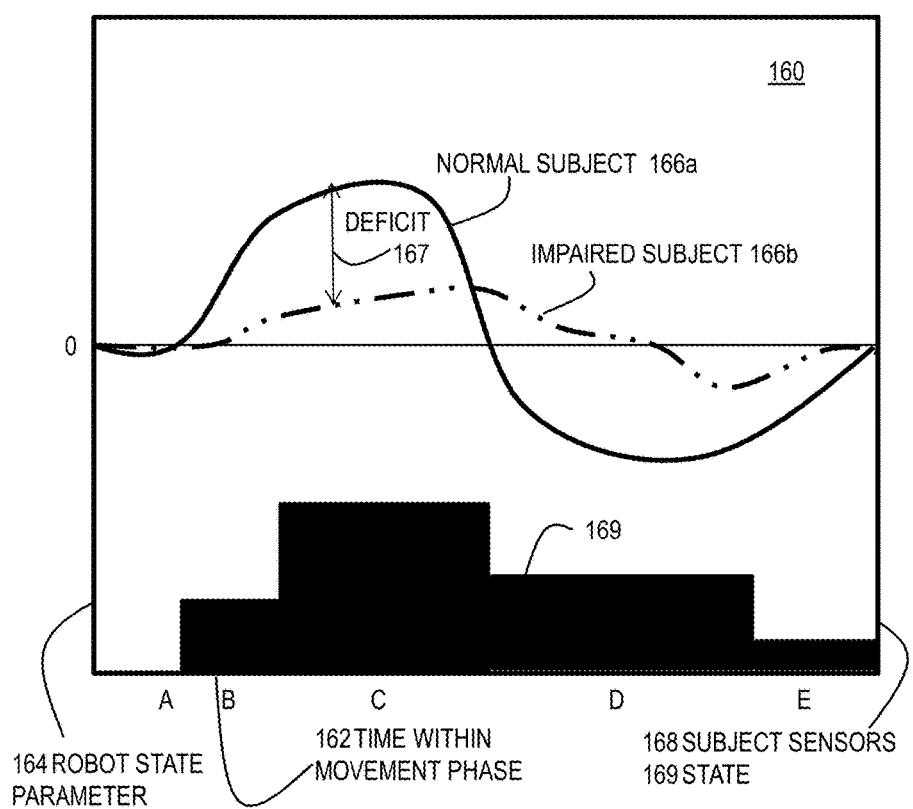
FIG. 1B illustrates an example of a robot state parameter trace for a normal and impaired subject and an applied robot state parameter over a plurality of movement phases, according to an embodiment.

FIG. 1B illustrates an example graph 160 of a robot state parameter trace 166a, 166b for a normal and impaired subject, according to one embodiment. The horizontal axis 162 indicates time, in relative units within a movement phase sequence. The left vertical axis 164 indicates the robot state parameter, such as subject achieved angle or subject applied torque, in relative units; and, the right vertical axis 168 indicates state of the collection of one or more subject sensors 120, in integer units. Trace 169 depicts changes in sensor state among a sequence of 5 different movement phases over time, based on the right vertical axis 168. Each different phase is associated with a different state of the output from sensors 120. For example, phase A is associated with no output from any sensor, and phase C is associated with maximum output from one or more sensors.

The trace 166a is based on the robot state parameter values as the normal subject moves the joint 192 through the plurality of movement phases, and plotted relative to left vertical axis 164. Similarly, the trace 166b is based on the robot state parameter as the impaired subject moves the joint 192 through the plurality of movement phases, and plotted relative to left vertical axis 164. The time axes of the two traces are adjusted relative to each other so that the movement phase for each trace is aligned, as indicated on the horizontal axis 162. This accounts for the impaired patient progressing through the movement phases at a different rate than a normal subject. The controller 140 receives the robot state parameter traces 166a, 166b data. The controller 140 also receives the sensor states 168 from the sensors 120, which indicate a current movement phase of the joint 192. The drive module 150 causes the controller 140 to determine a deficit trace 167 for each movement phase, based on a difference between the respective robot state parameter traces 166a, 166b. The drive module 150 also is configured to drive the motor 116 based on the difference. In one embodiment, the drive module 150 determines an average deficit 167 for each movement phase by computing a difference between the robot state parameter trace 166a of the normal subject and the robot state parameter trace 166b of the impaired subject, for each movement phase. The applied robot state parameter imparted on the joint 192 by the variable torque motor 116 depends on the movement phase determined by the drive module 150 and an adaptive magnitude from the drive module 150 for each movement phase, based on the movement phase and the associated deficit parameter 167 for each movement phase.

In some embodiments, a movement model is used to describe one or more of the movement phases indicated by trace 169. The movement model parameterizes the robot state parameter during each movement phase based on a set of one or more model parameters. A normal subject is expected to show one set of values for those model parameters of the model. An impaired subject is expected to show some deviation from that set of values. In some embodiments, using a movement model, the decision whether to apply a torque to the exoskeletal robot joint to assist an impaired subject, and the amount, is based on whether the set of values for the set of model parameters for the impaired patient is above or below a threshold set of values that represent some percentage of the set of normal values.

If the robot state parameter deficit 167 in a current movement phase is less than a robot state parameter threshold, the adaptive magnitude for the current movement phase is adjusted such that the controller 140 does not transmit an applied torque signal to the variable torque motor 116 during the current movement phase. If the robot state parameter deficit 167 in a current movement phase is greater than the robot state parameter threshold, the adaptive magnitude for the current movement phase is adjusted such that the controller 140 transmits the applied torque signal to the variable torque motor 116 during the current movement phase.

Figure 2:
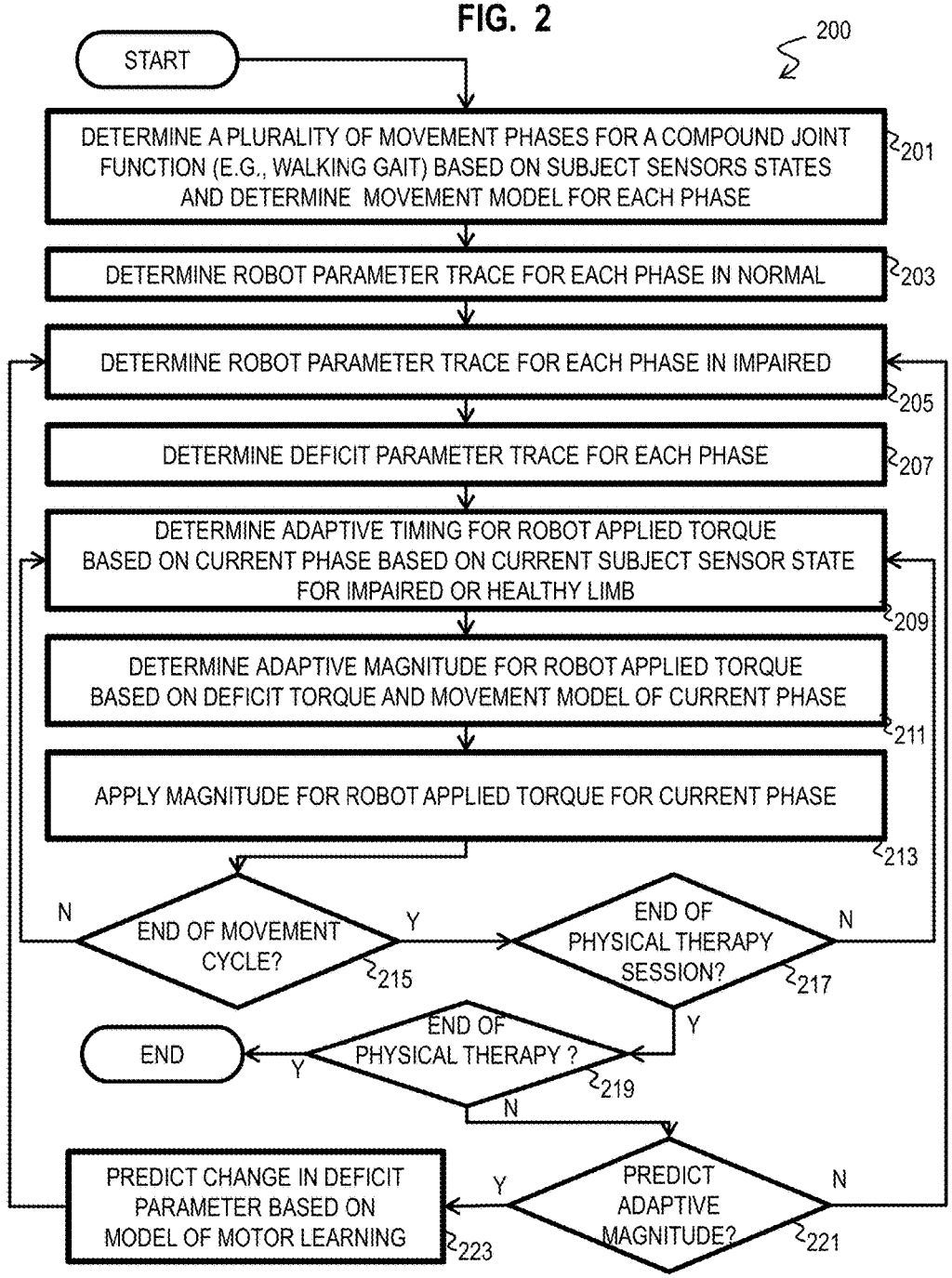
FIG. 2 is a flow diagram that illustrates an example of a method for providing deficit-adjusted adaptive assistance during a plurality of movement phases of an impaired joint, according to an embodiment.

FIG. 2 is a flow diagram that illustrates an example of a method 200 for providing deficit-adjusted adaptive assistance during a plurality of movement phases of an impaired joint 192, according to one embodiment. For example, the steps of method 200 are applied by module 150 of controller 140. Although the flow diagram of FIG. 2 is depicted as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

After starting, in step 201, the plurality of movement phases for the compound joint function are determined, on the module 150. In some embodiments, the phases are determined by analyzing movements observed in video of one or more normal subjects performing the compound movement. The states of the sensors 120 for each movement phase are then determined by recording for a normal subject the sensor state of the sensor 120 for each phase. In some embodiments, the sensor states associated with each movement phase are stored on a memory associated with module 150. In some embodiments, in step 201, the movement model for each movement phase is also determined. For example, the movement model is programmed as an instruction set on the module 150. In an example embodiment, described in a later section, mathematical movement models for an ankle during various phases of walking are programmed into module 150.

In step 203, the robot state parameter, such as the angle of the beams 112 in a normal subject during each movement phase is determined, e.g., based on new or historical records of the angle measurements from the sensors 121 when the motor 116 is not driven by controller 140. In some embodiments, during step 203, the exoskeletal robot joint 110 is attached to a normal subject who moves the beams 112 through the plurality of movement phases while the robot joint 110 does not apply torque.

During step 205, the exoskeletal robot joint 110 is attached to an impaired subject who moves the beams 112 through the plurality of movement phases while the robot joint 110 does not apply torque. As the impaired subject moves the beams 112 through the plurality of movement phases, the sensors 120 transmit the sensor states 168 to the module 150 along the sensor communication channels 122, so the module 150 can determine the movement phase that correspond to the sensor states 168. Additionally, as the impaired subject moves the beams 112 through the plurality of movement phases, the sensors 120 measure the robot state parameter, such as the angle of the joint 192 during movement of the joint 192 during each movement phase and transmits this robot state parameter data to the controller. If a movement model is used, then the module 150 compares the measured model parameter of movement of the beams 112 during each movement phase with the respective threshold parameter of movement for each movement phase.

In step 207, the deficit parameter trace 167 for each movement phase is determined by the module 150. After receiving the robot state parameter traces 166a, 166b in steps 203, 205, in step 207 the module 150 determines the deficit parameter trace 167 by computing a difference between the normal robot state parameter trace 166a and the impaired robot state parameter trace 166b, for each movement phase. In embodiments using a movement model, the parameter deficit is parameterized as a value of the one or more model parameters.

In step 209, the adaptive timing for the robot applied torque is determined for a current movement phase by the module 150 based on the current sensor state. For example, if the current sensor state is the maximum of curve 169 in FIG. 1B, then module 150 determines that the current movement phase is phase C. The module 150 then compares the deficit parameter 167 in the current movement phase with the robot state parameter threshold. If the module 150 determines that the parameter deficit 167 in the current movement phase is less than the robot state parameter threshold, the module 150 does not transmit an applied torque signal to the variable torque motor 116 during the current movement phase. If the module 150 determines that the deficit parameter 167 in the current movement phase is greater than the robot state parameter threshold, the module 150 transmits an applied torque signal to the variable torque motor 116 during the current movement phase.

In step 211, the adaptive magnitude for the robot applied torque is determined for a current movement phase by the module 150. In order to determine the adaptive magnitude of the applied torque during the current movement phase (e.g., phase C), the module 150 uses the calculated deficit parameter 167 for the current movement phase, or the parameterized value of the movement model. In an embodiment, although the deficit parameter 167 may vary within a current movement phase, the module 150 uses the determined movement model from step 201 for the current movement phase to determine a fixed adaptive magnitude, or a model curve of the magnitude, for the applied torque throughout the current movement phase (e.g., phase C).

In step 213, the adaptive magnitude of the robot applied torque is applied by the variable torque motor 116 on the pivot 114 for the current movement phase, based on the adaptive timing for the current movement phase. During step 213, the module 150 transmits the adaptive magnitude data for the applied torque for the current movement phase to the variable torque motor 116, based on the adaptive timing for the current movement phase from step 209. Upon receiving the adaptive magnitude data from the module 150, the variable torque motor 116 imparts the applied torque with the adaptive magnitude on the pivot 114 during the current movement phase. This applied torque assists the subject 190 in moving the limb 193 relative to the body 191, thus training the joint 192.

In step 215, a determination is made by the module 150 of whether the joint 192 has reached the end of a movement cycle, based on whether the beams 112 has reached the last movement phase of the movement cycle. In order to determine whether the joint 192 has reached the end of the movement cycle, the module 150 determines whether the sensor state 168 received by the module 150 from the sensors 120 indicate that the beams 112 are in the last movement phase (e.g., phase E). In step 201, the module 150 determined the sensor states 168 for each movement phase, including the sensor state 168 indicating the last movement phase. Thus, in step 215, the module 150 compares the sensor state 168 for the last movement phase with the sensor state 168 received from the sensors 120 for the current movement phase. If the module 150 determines that the beams 112 have not reached the last movement phase, the method returns to step 209. If the module 150 determines that the beams have reached the last movement phase, the method continues to step 217.

In step 217, a determination is made by the module 150 of whether a physical therapy session has ended. In order to determine whether the physical therapy session has ended, the module 150 determines how many movement cycles of the beams 112 have been completed and compares this number with a threshold number of movement cycles for a physical therapy session. If the beams 112 have completed the threshold number of movement cycles, the module 150 determines that the physical therapy session has ended and the method moves to step 219. If the beams 112 have not completed the threshold number of movement cycles, the module 150 determines that the physical therapy session has not ended and the method moves to step 209, described above.

In step 219, a determination is made by the module 150 of whether physical therapy has ended for the patient. In order to determine whether the physical therapy for the patient has ended, the module 150 determines how many physical therapy sessions have been completed by the patient and compares this number with a threshold number of physical therapy sessions for physical therapy. If the patient has completed the threshold number of physical therapy sessions, the module 150 determines that the physical therapy for the patient has ended and the method ends. If the patient has not completed the threshold number of physical therapy sessions, the module 150 determines that the physical therapy for the patient has not ended and the method moves to step 221.

In step 221, a determination is made by the module 150 of whether to predict a change in the adaptive magnitude of the applied torque, based on a progress of the patient. If the module 150 determines not to predict a change in the adaptive magnitude of the applied torque, and instead to re-measure a change in the adaptive magnitude of the applied torque, the method moves to step 205. The method then measures any change in the adaptive magnitude of the applied torque, by re-measuring the deficit parameter 167 for each movement phase in steps 205, 207, 209 and then using this re-measured deficit parameter 167 to measure a change in the adaptive magnitude in step 211 for each movement phase. If the module 150 determines to predict the change in the adaptive magnitude of the applied torque, the method moves to step 223.

In step 223, a prediction in the change of the adaptive magnitude of the applied torque is made by the module 150. In order to predict the change of the adaptive magnitude of the applied torque, the module 150 uses a model of motor learning, which estimates changes in the deficit parameter 167, based on one or more robot state parameters, such as the number of movement cycles completed. After the module 150 uses the model of motor learning to predict the change in the deficit parameter 167, the method confirms this prediction by moving to steps 205, 207, where the deficit parameter 167 is re-measured. In an embodiment, after the module 150 uses the model of motor learning to predict the change in the deficit parameter 167, the method need not confirm the predicted change in the deficit parameter 167 and may return directly to step 209.

2. Example Embodiments

A. Ankle

One example embodiment of the invention is utilized in the context of improving walking and balancing function after a patient experiences a stroke, by means of increasing contribution of a paretic (e.g. affected) ankle, since the ankle plays an important role in the biomechanics of gait and balance. Following a stroke, some (or all) of these ecological aspects of gait are disrupted. For example, "drop foot" is a common impairment caused by a weakness in the dorsiflexor muscles that lift the foot.

Figure 3:
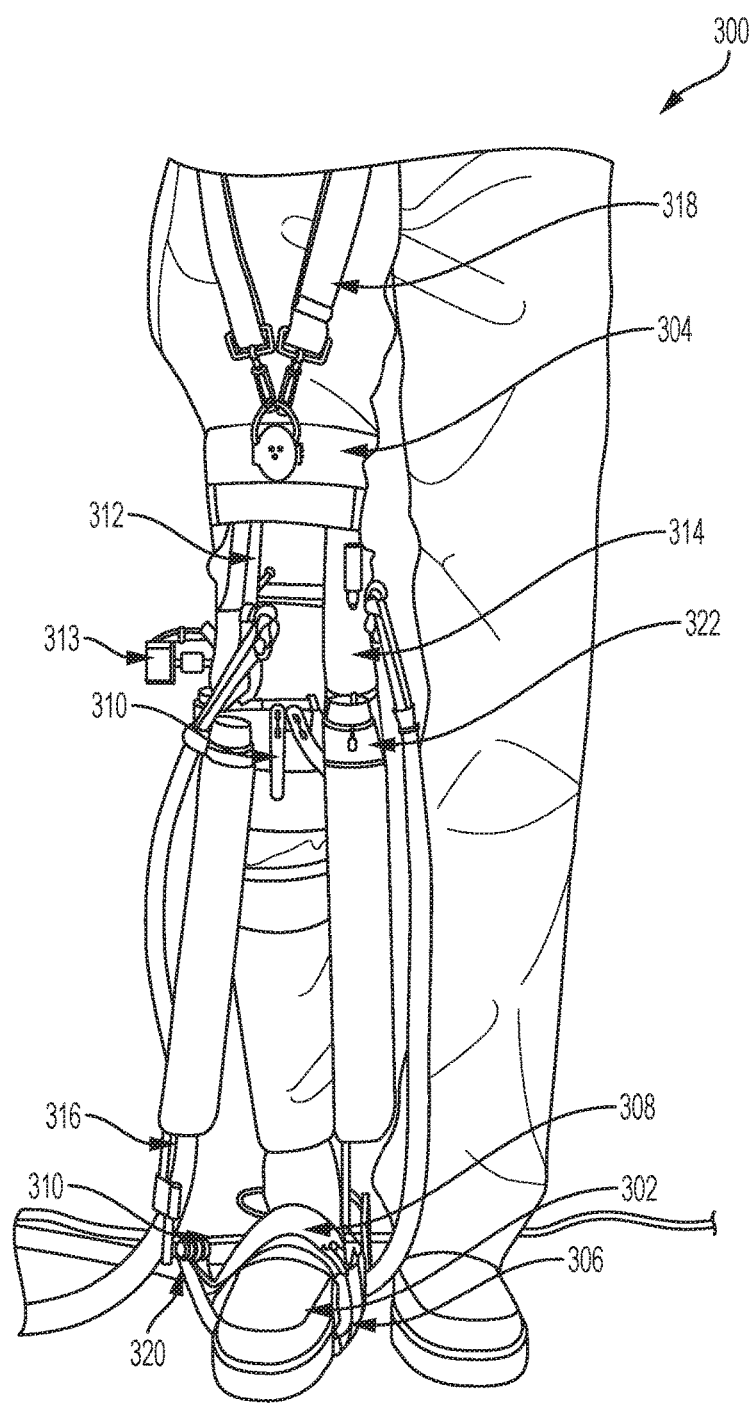
FIG. 3 illustrates an example system for providing deficit-adjusted adaptive assistance during a plurality of movement phases of an impaired ankle joint, according to an embodiment.

According to an example embodiment, the exoskeletal robot joint 110 is an anklebot. FIG. 3 is a photograph that illustrates an example system for providing deficit-adjusted adaptive assistance during a plurality of movement phases of an impaired ankle joint, according to an embodiment. The system includes an anklebot 300 which is secured to the body and foot on either side of the subject's ankle joint. The anklebot 300 is described in "Robot-aided neurorehabilitation: A novel robot for ankle rehabilitation," *IEEE T Rob*, vol. 25, pp. 569-82, 2009, which is incorporated by reference as if fully set forth herein. As illustrated in FIG. 3, the anklebot 300 includes a shoe 302 (corresponding to beam 112b for connection to limb 193) and a knee brace 304 which are worn by the subject and secured to the subject with quick connectors 306. A strap 308 is attached over a bridge of the subject's foot. The rest of the anklebot 300 is then mounted to the knee brace 304 using a pair of quick locks 310. The anklebot 300 includes a motor 314 (corresponding to motor 116) that is connected to the shoe 302 through a pair of linear actuators 316 (corresponding to beam 112a and drive chain 118) and selectively imparts torque on the shoe 302 around the ankle joint through the pair of linear actuators 316. In an example embodiment, the motor 314 is a pair of brushless dc motors, each capable of generating 0.25 Newton-meters (N-m) of continuous stall torque and 0.8 Nm of instantaneous peak torque. The traction drives 316 are connected to either side of the shoe 302 using a quick lock 310 and a ball joint 320 (corresponding to pivot 114) and are connected to the motor 314 at a ball joint 322. A first position sensor 312 (corresponding to one robot sensor 121) measures the position or angle of the shoe 302 and transmits this position or angle information to the motor 314, to commutate the motor 314. In an example embodiment, the first position sensor 312 is a rotary encoder. A second position sensor 313 (corresponding to another robot sensor 121) measures the position or angle of the shoe 302 and transmits this position or angle information to a controller 140 (not shown). In an example embodiment, the second position sensor 313 is a linear incremental encoder. The motor 314 may be used as a torque sensor and communicate current or voltage information to the controller 140 that can be used to measure an imparted torque around the ankle joint by the subject. As illustrated in FIG. 3, the anklebot 300 also includes a shoulder strap 318, to optionally support a weight of the subject during the use of the anklebot 300.

In an example embodiment, the anklebot 300 is a 3-degree of freedom (DOF) wearable robot, backdriveable with low intrinsic mechanical impedance, that weighs less than 3.6 kg. It allows normal range of motion (ROM) in all 3 DOF of the foot relative to the shank during walking overground, on a treadmill, or while sitting. In an example embodiment, the anklebot 300 provides actuation in two of the ankle's 3 DOF, namely plantar-dorsiflexion and inversion-eversion via the two linear actuators 316 mounted in parallel. In an example embodiment, internal-external rotation is limited at the ankle with the orientation of the foot in the transverse plane being controlled primarily by rotation of the leg. If both actuators 316 push or pull in the same direction, a DP (dorsiflexion-plantar) torque is produced. Similarly, if the two actuators 316 push or pull in opposite directions, inversion-eversion torque results. In an example embodiment, the anklebot 300 allows 25° of dorsiflexion, 45° of plantarflexion, 25° of inversion, 20° of eversion, and 15° of internal or external rotation. These limits are near the maximum range of comfortable motion for normal subjects and beyond what is required for typical gait. In an example embodiment, the anklebot 300 can deliver a continuous net torque of approximately 23 N·m in DP torque and 15 N·m in eversion-inversion (IE) torque. In an example embodiment, the anklebot 300 has low friction (0.744 N·m) and inertia (0.8 kg per actuator for a total of 1.6 kg at the foot) to maximize the backdriveability.

Figure 4A:
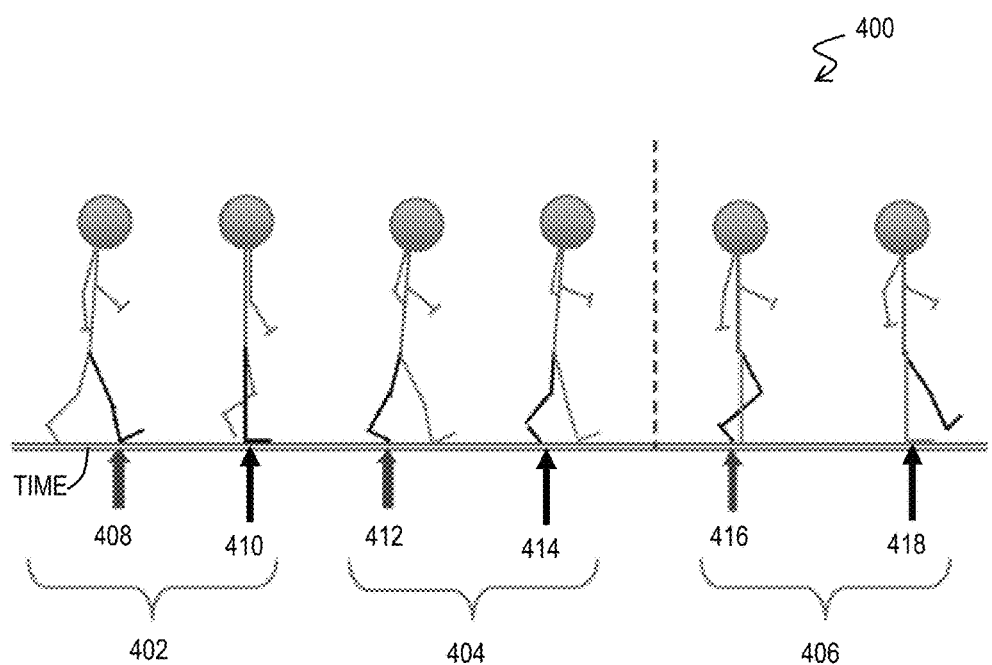
FIG. 4A is a diagram of a plurality of movement phases of a gait cycle of an ankle joint, according to an embodiment.

To perform step 201 of the method 200, a plurality of movement phases for a gait cycle 400 of the impaired ankle joint are initially determined. FIG. 4A is a diagram of a plurality of movement phases of the gait cycle 400 of the ankle joint, according to an embodiment. The gait cycle 400 begins with an early stance 402 which includes a heel strike movement phase 408 and a mid stance movement phase 410. The gait cycle 400 then proceeds to a late stance 404 which includes a heel off movement phase 412 and a toe off movement phase 414. The gait cycle 400 then proceeds to a swing 406 that includes an initial swing movement phase 416 and a terminal swing movement phase 418.

Figure 4B:
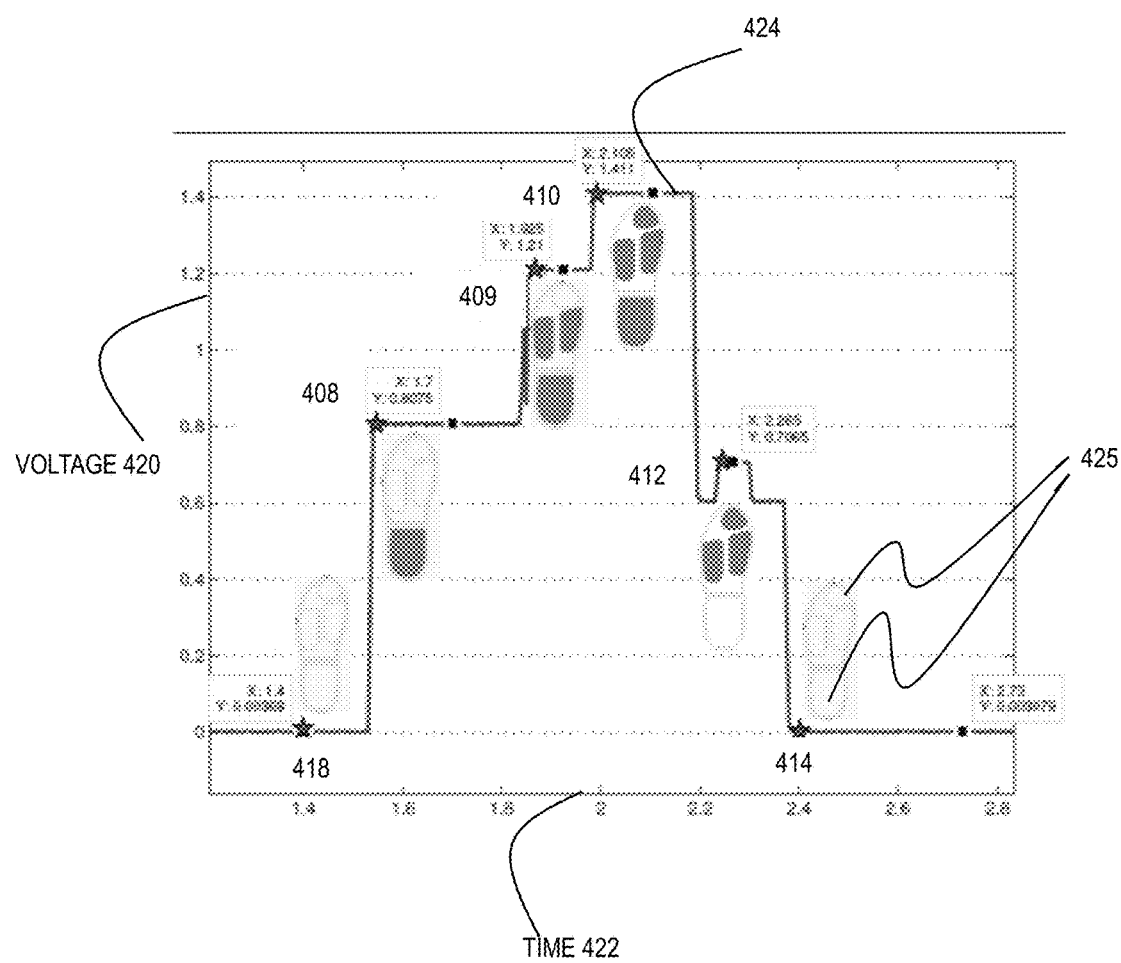
FIG. 4B is a trace of sensor state output over the plurality of movement phases of the gait cycle of FIG. 4A, according to an embodiment.

In order to determine when the subject is in each of these movement phases, FIG. 4B illustrates footswitches 425 (corresponding to subject sensors 120) that are positioned in a heel region, a toe region, a medial region and a lateral region of the shoe 302 of the anklebot 300. The footswitches 425 are connected to the drive module 150 through the controller 140 of the anklebot 300 and communicates the collective output of the footswitches 425 to the drive module 150, during each movement phase of the gait cycle 400. Each footswitch 425 is a pressure sensor which switches to an "on" position and outputs a respective voltage signal when a threshold pressure is detected in that respective region of the shoe. Each footswitch 425 remains in an "off" position and does not output the respective voltage signal if the threshold pressure is not detected in that respective region of the shoe.

As illustrated in the FIG. 4B, a trace 424 is shown of the collective voltage output of the footswitches 425, plotted against a vertical axis 420 versus a horizontal time axis 422 that includes the plurality of movement phases of the gait cycle 400. The trace 424 begins at a minimum collective voltage output of the footswitches 425 when the subject enters the terminal swing movement phase 418 and each footswitch 425 is "off", since no region of the shoe is in contact with the ground. The trace 424 increases when the subject enters the heel strike movement phase 408, when the heel region footswitch 425 is "on" and the other footswitches 425 are "off", since only the heel region of the shoe contacts the ground. The trace 424 continues to increase when the subject enters an early stance movement phase 409 between the heel strike movement phase 408 and the mid stance movement phase 410, when the heel region footswitch 425, medial region footswitch 425 and lateral region footswitch 425 are each "on" while the toe region footswitch 425 is "off". The trace 424 increase to a maximum collective voltage output of the footswitches 425 when the subject enters the mid stance movement phase 410 and each footswitch 425 is "on" since all regions of the shoe are in contact with the ground. The trace 424 decreases when the subject enters the heel off movement phase 412, when the heel region footswitch 425 is "off" and the remaining footswitches 425 are "on", since the toe region, medial region and lateral region of the shoe are in contact with the ground. The trace 424 then decreases to the minimum collective voltage output of the footswitches 425 when the subject enters the toe off movement phase 414 and each footswitch 425 is "off", since no region of the shoe is in contact with the ground. The trace 424 continues to repeat as the gait cycle 400 is repeated by the subject.

Figure 5:
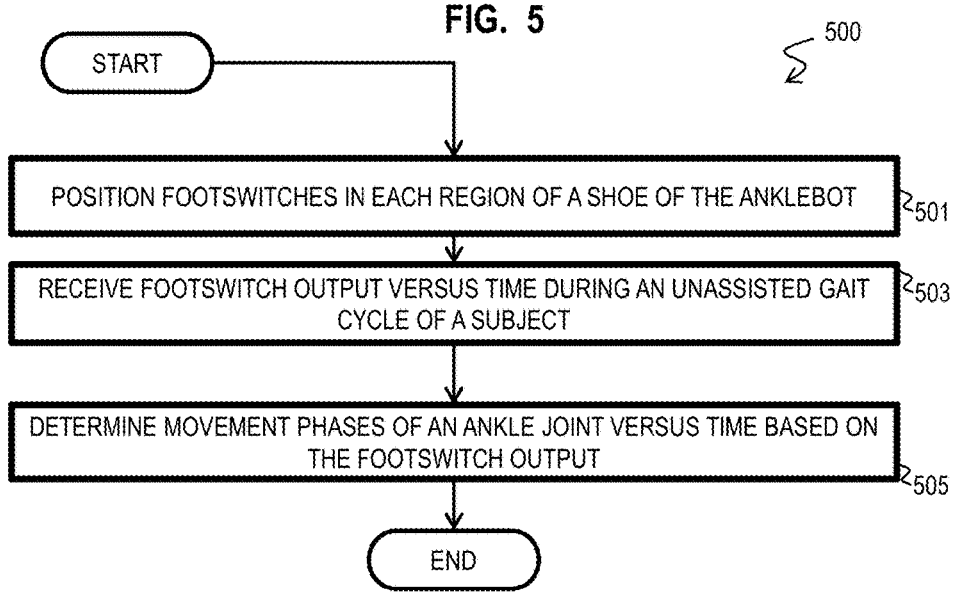
FIG. 5 is a flow diagram that illustrates an example of a method for determining a plurality of movement phases for an ankle joint based on footswitch output, according to an embodiment.

To perform step 201 of the method 200 in the example embodiment, FIG. 5 is a flow diagram that illustrates an example of a method 500 for determining a plurality of movement phases for an ankle joint function based on footswitch 425 output, according to an embodiment. After starting, in step 501 the footswitches 425 are positioned in each region of the shoe 302 of the anklebot 300, including the toe region, the heel region, the medial region and the lateral region. The anklebot 300 is then attached to a subject, such as a normal subject without an impaired ankle joint. The normal subject then walks unassisted for a predetermined time period, such as 1 minute. In step 503, the drive module 150 of the controller 140 receives the collective footswitch 425 output from the footswitches 425 as the subject walks through multiple gait cycles 400. In step 505, the module 150 analyzes the collective footswitch 425 output over time, and compares the footswitch 425 output with predetermined voltage thresholds for each movement phase that are stored in a memory of the module 150. Based on this analysis, in step 505, the module 150 determines the movement phases of the gait cycle 300 for the ankle joint, based on the collective footswitch 425 output.

Figure 6:
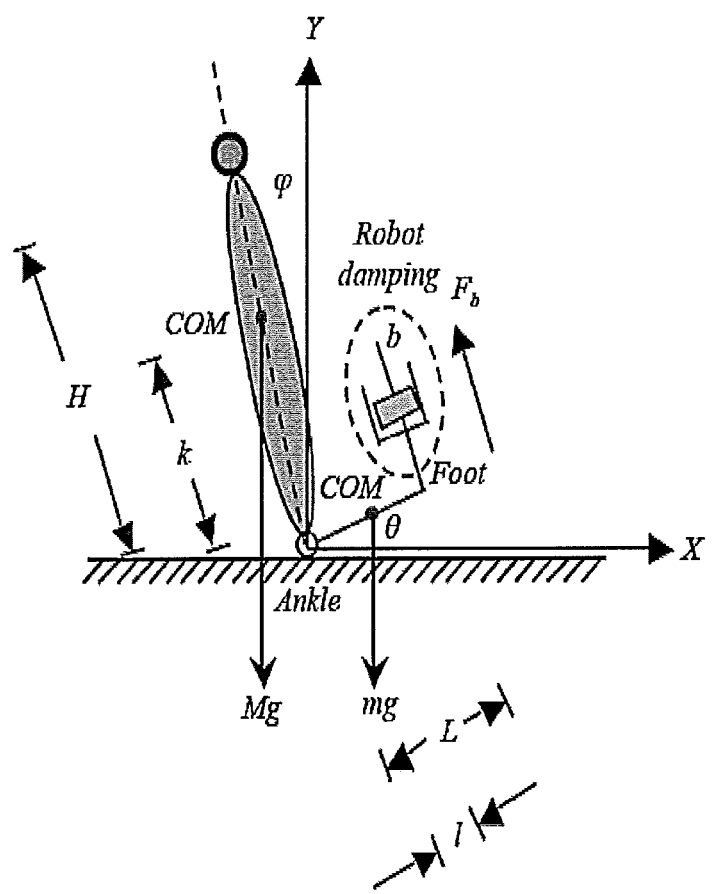
FIG. 6 is a diagram that illustrates dimensions of a body and a foot wearing the anklebot.

Additionally, to perform step 201 of the method in the example embodiment, a movement model for each movement phase is determined and programmed into the module 150 of the controller 140. FIG. 6 illustrates the components of the model, according to an embodiment. The movement model for a deficit moving between the heel strike movement phase 408 and the mid stance movement phase 410 (also known as "foot slap") is parameterized by a minimum damping parameter $b_{min}$ defined by Equation 1:

$$b_{min} \geq \frac{\alpha g M H \phi}{V_m - V_{HS}} \quad (1)$$

where $\alpha$ is k/H; k is a distance between a body center of mass and the ankle (in meters, m); H is the height of the body (meters, m); M is the mass of the body (in kilograms, kg); g is the acceleration due to gravity (9.81 ms$^{-2}$); $\phi$ is the angle between the subject's body part (e.g. 191) and a vertical direction (radians, rad); $V_m$ is the desired maximum angular velocity of the foot during the heel strike movement phase 408 (degrees per second, °/sec) and $V_{HS}$ is the measured maximum angular velocity of the foot during the heel strike movement phase 408 (degrees per second, °/sec).

Figure 7:
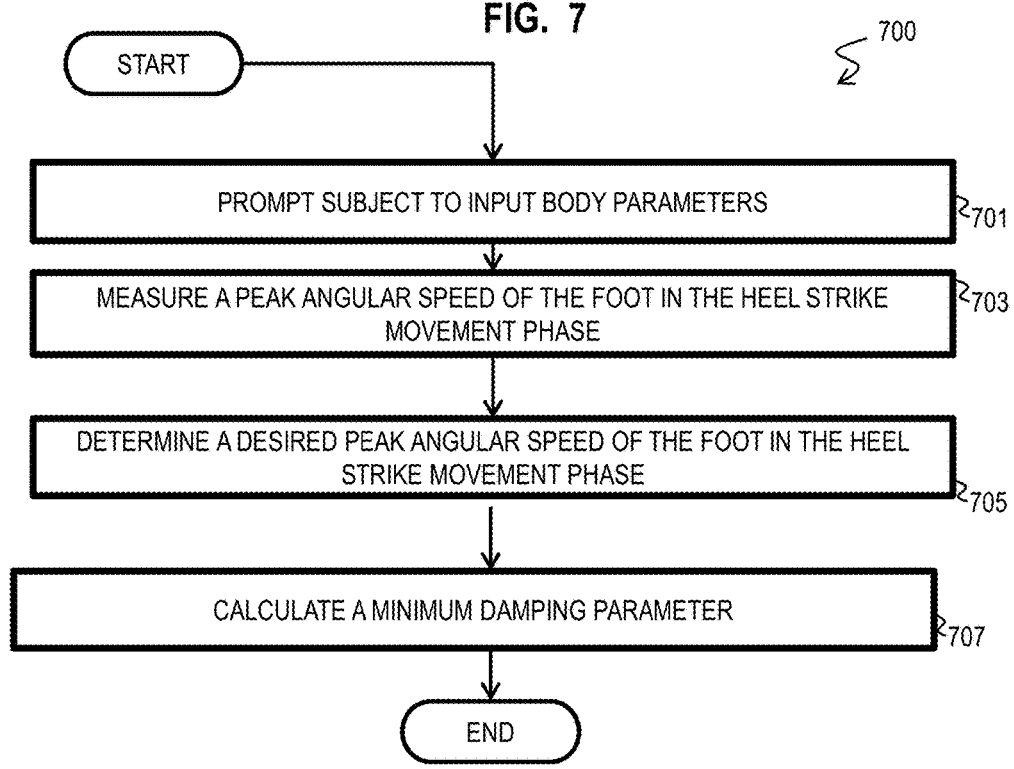
FIG. 7 is a flow diagram that illustrates an example of a method for determining a movement model for a heel strike movement phase of a gait cycle, according to an embodiment.

FIG. 7 is a flow diagram that illustrates an example of a method 700 for determining a movement model between the heel strike movement phase 408 and the mid stance movement phase 410 of the gait cycle 400 of an ankle joint function, according to an embodiment. In step 701, the module 150 prompts the subject to input the body parameters of Equation 1, including the distance k, the height H, the mass M, and the angle $\phi$. In step 703, the module 150 measures a peak angular speed of the foot of the subject between the movement phase 408, 410, during an unassisted walking cycle of an impaired subject, as discussed below. In step 705, the module 150 determines a desired peak angular speed of the foot between the movement phase 408, 410. In an example embodiment, the desired peak angular speed may be fixed for all subjects at a typical normative value of an age-matched non-impaired subject. In one example, the desired peak angular speed is 200 degrees per second. In an example embodiment, the desired peak angular speed is determined, based on measuring a peak angular speed of a non-paretic foot during an unassisted walking cycle of an impaired subject. In step 707, the module 150 uses Equation 1 to calculate the minimum damping parameter $b_{min}$. The steps of the method 700 are programmed into the module 150 and upon determining that an impaired subject suffers from the "foot slap" deficit between the heel strike movement phase 408 and the mid stance movement phase 410, the module 150 commences the steps of the method 700, to determine the minimum damping parameter, which is used to parameterize the torque for movement between the heel strike movement phase 408 and the mid stance movement phase 410.

Figure 8:
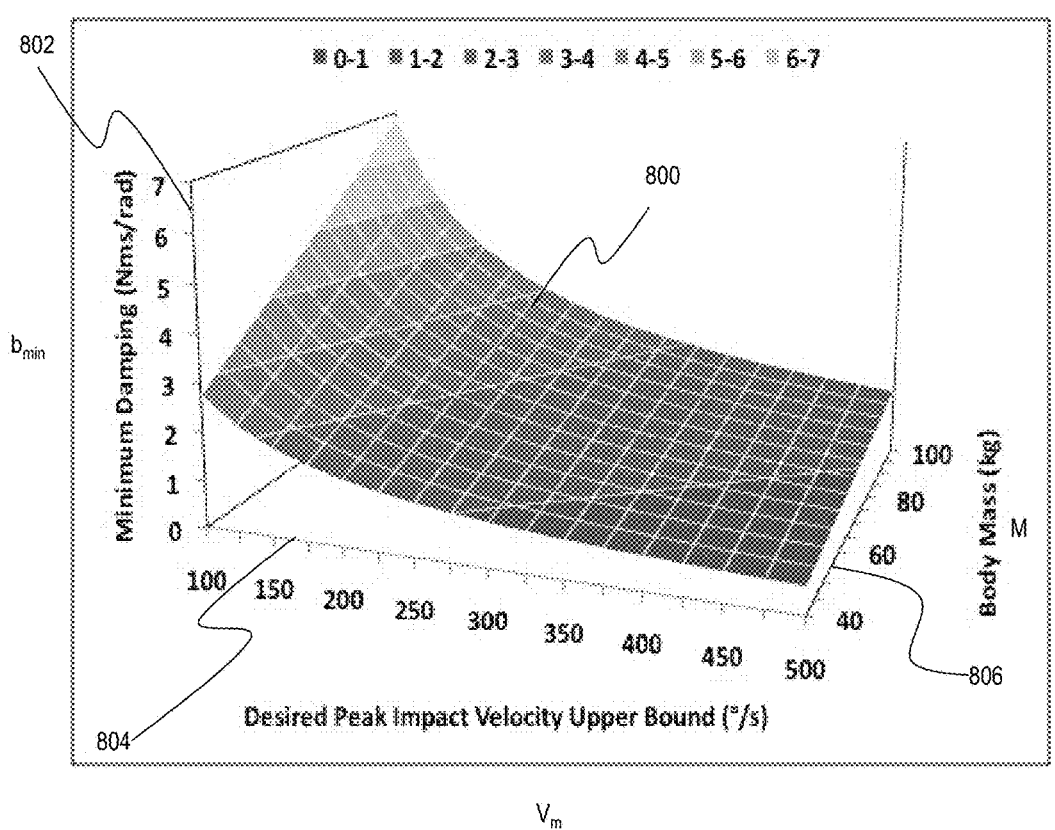
FIG. 8 is a graph that illustrates an example of a minimum damping parameter trace based on a body mass and a desired peak angular speed of a subject, according to an embodiment.

FIG. 8 illustrates an example of a minimum damping parameter surface 800 determined based on a body mass M and a desired peak angular speed $V_m$ of a subject. The surface 800 value is given by a vertical axis 802 of values of the minimum damping parameter $b_{min}$. The desired peak angular speed $V_m$ value is given by a position relative to a first horizontal axis 804 while the body mass M value is given by a position relative to a second horizontal axis 806. Instead of using Equation 1 to calculate the minimum damping parameter $b_{min}$, a digital version of FIG. 8 provides an optional "quick look up" surface 800, to determine the minimum damping parameter $b_{min}$ based on a known mass M and desired angular speed $V_m$. Either Equation 1 or the surface 800 of FIG. 8 provides the minimum damping parameter $b_{min}$ used for the measured maximum angular velocity at the heel strike movement phase ($v_{HS}$) to be equal to or lower than desired maximum angular velocity at heel strike movement phase ($V_m$).

Figure 9:
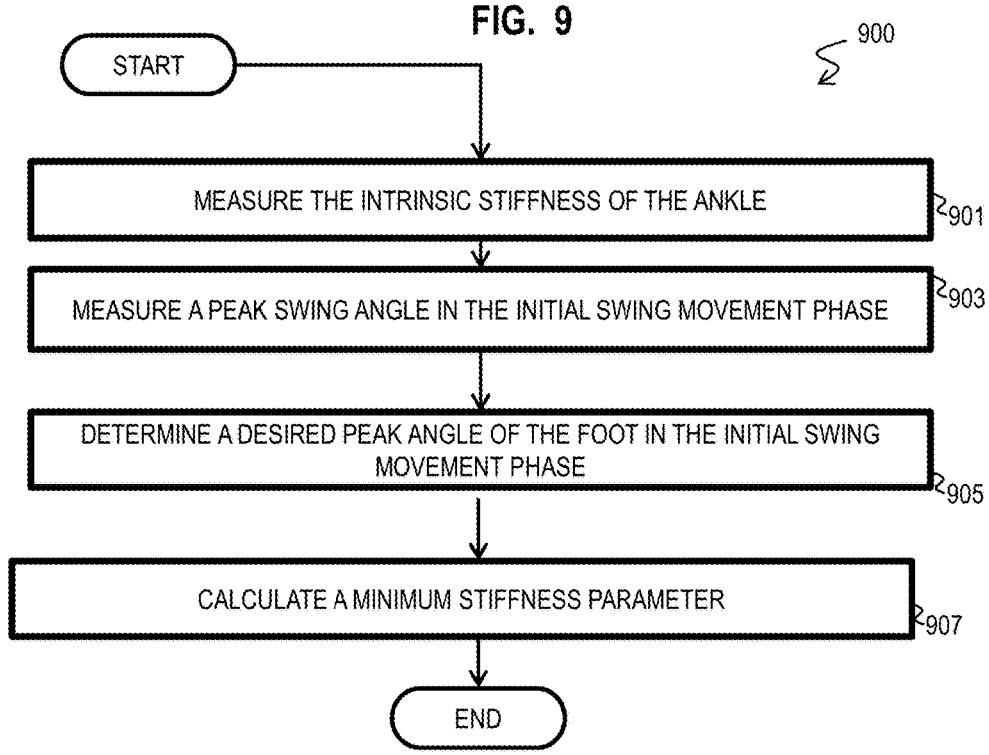
FIG. 9 is a flow diagram that illustrates an example of a method for determining a movement model for an initial swing movement phase of a gait cycle, according to an embodiment.

Additionally, to perform step 201 of the method in the example embodiment, a movement model for movement between the initial swing movement phase 416 and the terminal swing movement phase 418 (also known as "drop foot") is parameterized by a minimum stiffness parameter $K_{min}$ provided by Equation 2:

$$K_{min} = \frac{\gamma K_h}{1 - \gamma} \quad (2)$$

where $\gamma$ is $\theta_{max}/\theta_d$ (between 0 and 1); $\theta_{max}$ is an actual peak angle measured during the initial and terminal swing movement phases 416, 418 (in degrees, °); $\theta_d$ is a desired peak angle measured during the initial and terminal swing movement phases 416, 418 (in degrees, °) and $K_h$ is an intrinsic stiffness of the ankle (in Newton meters per radian, Nm/rad). FIG. 6 illustrates the angle $\theta$ measured between the ground and the foot of the subject during the initial and terminal swing movement phases 416, 418. FIG. 9 is a flow diagram that illustrates an example of a method 900 for determining a movement model for movement between the initial swing movement phase 416 and the terminal swing movement phase 418 of the gait cycle 400, according to an embodiment.

In step 901, the module 150 determines the intrinsic stiffness $K_h$ of the ankle. In an example embodiment, while the subject is in a seated position, the module 150 transmits signals to the motor 314 to tilt the foot at a constant angular velocity, such as 5 degrees per second. In an example embodiment, each tilt begins and ends at the neutral position and moves in increments of 5 degrees (e.g. ±5 degrees from neutral, ±10 degrees from neutral, etc.). For each angular displacement of the foot, a responsive torque is measured, using current or voltage data sent from the motor 314 to the controller 140. The ratio of the measured torque (in units of Nm) to angular displacement (in radians) from neutral yields an estimate of the intrinsic ankle stiffness (Nm/rad). In one example embodiment, the intrinsic ankle stiffness estimates were thus obtained in each direction of movement within a DOF by fitting the pair-wise steady-state torque and angle data using least-squares linear regression.

In step 903, the module 150 measures a peak swing angle of the foot of the subject during the initial and terminal swing phases 416, 418, during an unassisted walking cycle of an impaired subject, as discussed below.

In step 905, the module 150 determines a desired peak angle of the foot in the initial and terminal swing phases 416, 418. In an example embodiment, the desired peak angle may be fixed for all subjects at a typical normative value of an age-matched non-impaired subject. In one example, the desired peak angle is in a range of 10-12 degrees. In an example embodiment, the desired peak angle is determined, based on measuring a peak angle of a non-paretic foot during an unassisted walking cycle of an impaired subject.

In step 907, the module 150 uses Equation 2 to calculate the minimum stiffness parameter $K_{min}$. The steps of the method 900 are programmed into the module 150 and upon determining that an impaired subject suffers from the "drop foot" deficit between the initial and terminal swing phases 416, 418, the module 150 commences the steps of the method 900, to determine the minimum stiffness parameter, which is used to parameterize the torque for movement between the initial and terminal swing phases 416, 418.

Figure 10:
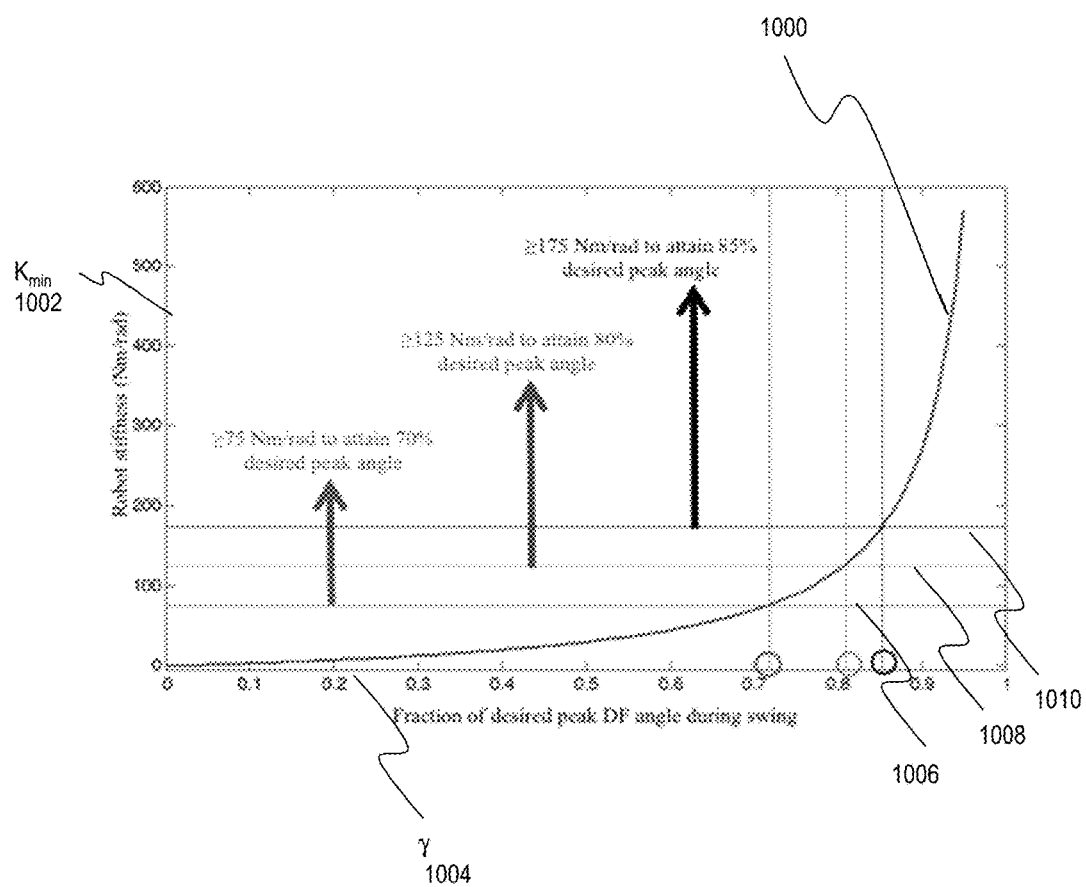
FIG. 10 is a graph that illustrates an example of a minimum stiffness parameter trace based on a ratio of an actual peak swing angle of a subject to a desired peak swing angle, according to an embodiment.

FIG. 10 is a graph that illustrates an example of a minimum stiffness parameter trace 1000 based on the ratio $\gamma$ of the actual peak swing angle $\theta_{max}$ of a subject to the desired peak swing angle $\theta_d$, according to an embodiment. The trace 1000 has a value based on a position relative to a vertical axis 1002 of values of the minimum stiffness parameter $K_{min}$. The ratio $\gamma$ is indicated by a horizontal axis 1004. The trace 1000 is formed using Equation 2 based on an intrinsic stiffness $K_h$ of 30 Nm/rad. Instead of using Equation 2 to calculate the minimum stiffness parameter $K_{min}$, a digital table of the trace 1000 in FIG. 10 provides an optional "quick look up" table, to determine the minimum stiffness parameter $K_{min}$ based on a known ratio $\gamma$ of the actual peak swing angle $\theta_{max}$ of a subject to the desired peak swing angle $\theta_d$. Both Equation 2 and the trace 1000 of FIG. 10 provides the minimum stiffness parameter $K_{min}$ needed for the actual peak angle $\theta_{max}$ to be a desired ratio $\gamma$ of the desired peak swing angle $\theta_d$. FIG. 10 illustrates a plurality of vertical intercept lines 1006, 1008, 1010 that intersect the vertical axis 1002 at respective values of $K_{min}$ that achieve a particular ratio $\gamma$ of the actual peak swing angle $\theta_{max}$ of a subject to the desired peak swing angle $\theta_d$. For example, the vertical intercept line 1008 intersects the vertical axis 1002 at a $K_{min}$ value of 125 Nm/rad, indicating the value of $K_{min}$ required to achieve a ratio $\gamma$ of 0.8.

Additionally, to perform step 201 of the method in the example embodiment, a movement model for movement between the heel off movement phase 412 and the toe off movement phase 414 (also known as "push off") uses a different minimum stiffness parameter than the minimum stiffness parameter of Equation 2 for the movement model between the initial and terminal swing movement phases 416, 418. The minimum stiffness parameter for the movement model between the heel off movement phase 412 and toe off movement phase 414 is determined by a process discussed in "Facilitating Push-Off Propulsion: A Biomechanical Model of Ankle Robotics Assistance For Plantar-flexion Gait Training In Stroke", *IEEE RAS & EMBS International Conference on BioRob*, Aug. 12-15, 2014 (hereinafter referred to as "Roy 2014"), which is incorporated by reference as if fully recited herein. In contrast to the minimum stiffness parameter $K_{min}$ of Equation 2 for the movement model between the initial swing movement phase 416 and the terminal swing movement phase 418, the minimum stiffness parameter $K_{min}$ based on Equation 32 in Roy 2014 (hereinafter referred to as "$K_{min2}$") corresponds to the minimum stiffness needed to attain a desired (i.e. normative) value of anterior-posterior (AP) impulse (that is, the definite time integral of force where integral time limits are the heel off movement phase 412 for the lower bound and the toe off movement phase 414 for the upper bound) during late stance 404 of the gait cycle 400. Hence, the minimum stiffness parameter $K_{min2}$ is used to calculate supplemental plantar-flexion assistance (i.e. torque) needed to attain desired AP propulsive impulse during late stance 404, as many stroke survivors have weak push-off propulsion owing to diminished mechanical power generation by the ankle musculature (in this case, the plantar-flexors—the two primary plantar-flexors are Gastrocnemious and Soleus muscles).

Figure 11:
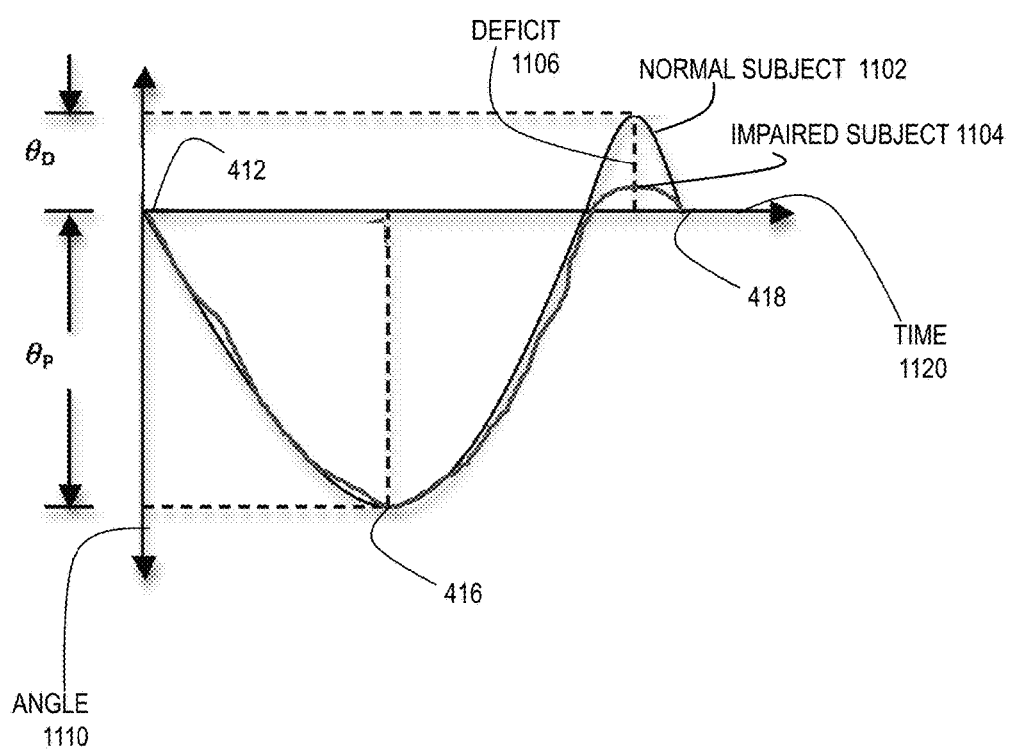
FIG. 11 is a graph that illustrates an example of an angle trace for a normal and impaired subject over a plurality of movement phases, according to an embodiment.

To perform step 203 of the method 200, the anklebot 300 is worn by a normal subject who walks for a predetermined amount of time, such as 1 minute, and moves the ankle joint through the plurality of movement phases while the anklebot 300 does not apply torque. As the normal subject moves the ankle through the plurality of movement phases, the foot-switches 425 transmit the voltage 420 signal to the module 150, so the module 150 can determine the movement phase that correspond to the voltage 420 signal. Additionally, as the normal subject moves the ankle joint through the plurality of movement phases, the sensor 313 measures the position or angle of the foot based on the movement of the ankle during each movement phase and transmits this position or ankle data to the drive module 150 through the controller 140. In some embodiments, the torque sensor (e.g. motor 314) measures the torque applied by the movement of the ankle during each movement phase and transmits this torque data to the module 150 through the controller 140. As a result of the angle data or position data received by the module 150, FIG. 11 illustrates an example of an angle trace 1102, 1104 for a normal and impaired subject over a plurality of movement phases, according to an embodiment. The horizontal axis 1120 indicates time, in relative units within a movement phase sequence. The left vertical axis 1110 indicates the measured angle of the foot relative to the ground. The angle trace 1102 is measured by the sensor 313 (or by the motor 314 using torque data), as the normal subject moves the ankle joint through the plurality of movement phases, and plotted relative to the vertical axis 1110. The module 150 uses the received footswitch 425 data versus time to determine the angle trace 1102 within each movement phase of the gait cycle 400. As illustrated in FIG. 11, when the normal subject enters the heel off movement phase 412, the angle trace 1102 is approximately zero since the foot is approximately flat on the ground. As the subject moves from the heel off movement phase 412, the angle trace 1102 decreases as the angle of the foot becomes increasingly negative and reaches a negative peak angle $\theta_p$ at the initial swing movement phase 416. As the subject moves from the initial swing movement phase 416, the angle trace 1102 increases and reaches the maximum peak angle $\theta_d$ (also called the desired peak angle) before the subject reaches the terminal swing movement phase 418. The angle trace 1102 is stored in a memory of the module 150. In an embodiment, instead of the angle trace 1102, in step 203 a torque trace is formed based on the torque data provided to the module 150 from the torque sensor (e.g. motor 314) during the unassisted walk of the normal subject and the torque trace is stored in the memory of the module 150.

To perform step 205 of the method 200, the anklebot 300 is worn by an impaired subject who walks for a predetermined amount of time, such as 1 minute, and moves the ankle joint through the plurality of movement phases while the anklebot 300 does not apply torque. As the impaired subject moves the ankle through the plurality of movement phases, the footswitches 425 transmit the voltage 420 signal to the module 150, so the module 150 can determine the movement phase that correspond to the voltage 420 signal. Additionally, as the impaired subject moves the ankle joint through the plurality of movement phases, the sensor 313 measures the position or angle of the foot based on the movement of the ankle during each movement phase and transmits this position or ankle data to the controller 140. In some embodiments, the torque sensor (e.g. motor 314) measures the torque applied by the movement of the ankle during each movement phase and transmits this torque data to the controller 140. Additionally, in an embodiment, during step 205, the peak angular speed (e.g. step 703 of method 700) is measured during the heel strike movement phase 408 and the peak swing angle $\theta_{max}$ (e.g. step 903 of method 900) is measured during the initial swing movement phase 416. As a result of the angle data or position data received by the module 150, FIG. 11 illustrates an angle trace 1104 that is measured by the sensor 313 (or by the motor 314 using torque data), as the impaired subject moves the ankle joint through the plurality of movement phases, and plotted relative to the vertical axis 1110. In an embodiment, in step 205, instead of the angle trace 1104, a torque trace is formed based on the torque data provided to the module 150 from the torque sensor (e.g. motor 314) during the unassisted walk of the impaired subject and the torque trace is stored in the memory of the module 150.

In an embodiment, the anklebot 300 includes footswitches 425 positioned in both shoes 302 worn by the subject and the module 150 receives a collective voltage 420 signal from each set of footswitches 425 from each shoe 302. During step 205, if the angle deficit of the impaired subject is extensive, the module 150 may be unable to determine the movement phase that corresponds to the voltage signal 420 received from the footswitches 425 in the shoe 302 of the impaired foot. The module 150 is then configured to determine the movement phase of the impaired foot, based on the voltage signal 420 received from the footswitches 425 in the shoe 302 of the non-impaired foot. The module 150 first determines the movement phase of the non-impaired foot, based on the voltage signal 420 received from the footswitches 425 in the shoe 302 of the non-impaired foot, and then converts the movement phase of the non-impaired foot to a movement phase of the impaired foot. A memory of the module 150 stores the conversion relationship between a movement phase of the non-impaired foot and a movement phase of the impaired foot during the gait cycle 400. For example, when the non-impaired foot is in the mid stance movement phase 410, the impaired foot is in the heel off movement phase 412. In this embodiment, the module 150 uses the footswitch 425 signals from the non-impaired foot during the use of the anklebot 300, to determine the current movement phase and the timing and magnitude of the torque applied to the foot.

Figure 12:
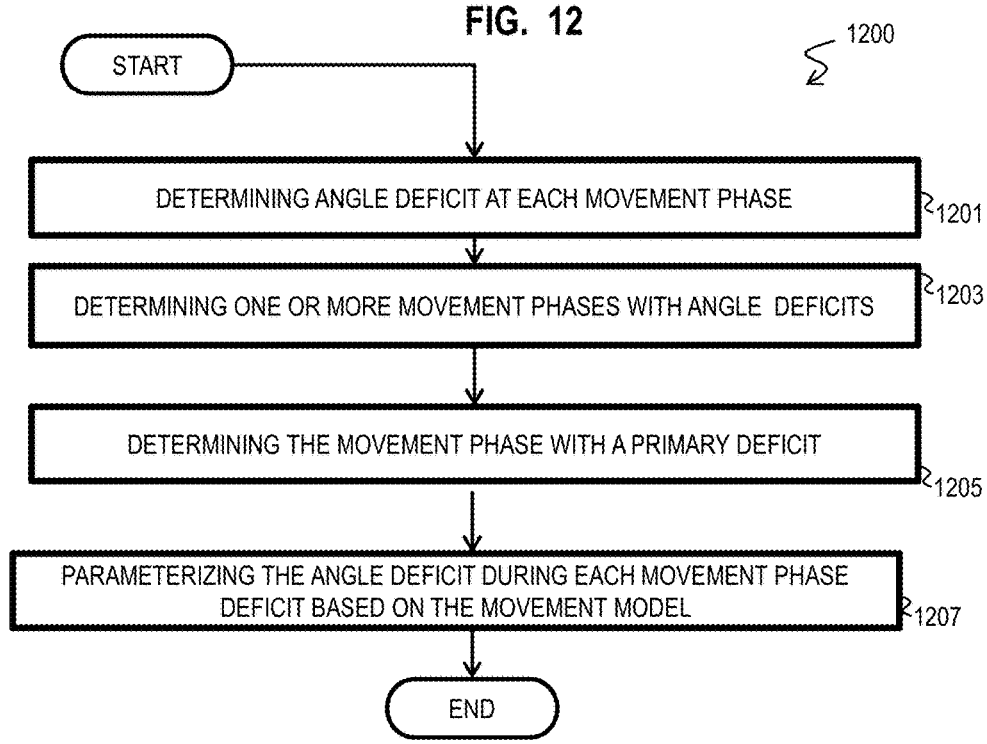
FIG. 12 is a flow diagram that illustrates an example of a method for determining a deficit angle for each movement phase of a gait cycle, according to an embodiment.

To perform step 207 of the method 200, FIG. 12 is a flow diagram that illustrates an example of a method 1200 for determining the deficit angle 1106 for each movement phase of the gait cycle 400, according to an embodiment. In step 1201, the module 150 determines the deficit angle 1106 for each movement phase, based on the respective angle traces 1102, 1104. In one embodiment, the module 150 determines the deficit angle 1106 for each movement phase by computing a difference between the angle trace 1102 for the normal subject and the angle trace 1104 for the impaired subject, for each movement phase.

In step 1203, the module 150 determines a magnitude and a polarity of the deficit angle 1106 between the angle traces 1102, 1104 for each movement phase. The module 150 then identifies the movement phase for each deficit angle 1106, based on the magnitude and polarity of the deficit angle 1106. In an example embodiment, the module 150 identifies an angle deficit 1106 between the heel off movement phase 412 and the toe off movement phase 414, based the polarity of the deficit angle 1106 being positive and the magnitude of the deficit angle 1106 being greater than a first minimum threshold. In an example embodiment, the module 150 identifies an angle deficit 1106 between the initial swing movement phase 416 and the terminal swing movement phase 418, based the polarity of the deficit angle 1106 being positive and the magnitude of the deficit angle 1106 being greater than a second minimum threshold that is less than the first minimum threshold. In an example embodiment, the first minimum threshold is in a range of 5-10° and the second minimum threshold is in a range of 0-5°. In an example embodiment, the module 150 identifies an angle deficit 1106 between the heel strike movement phase 408 and the mid stance movement phase 410, based on the polarity of the deficit angle 1106 being negative and a magnitude of the maximum angular velocity ($v_{HS}$) being greater than a threshold velocity. In an example embodiment, the threshold velocity is in a range of 45-55°/sec. In an example embodiment, the module 150 does not identify an angle deficit 1106 during a movement phase where the magnitude of the deficit angle 1106 is zero or less than a minimum threshold. As illustrated in FIG. 11, the module 150 determines that the polarity of the deficit angle 1106 is positive (e.g. angle trace 1102 is greater than angle trace 1104) and that the magnitude of the deficit angle 1106 is greater than the second minimum threshold. Thus, the module 150 identifies the angle deficit 1106 as between the initial and terminal swing movement phases 416, 418. Additionally, as illustrated in FIG. 11, the module 150 determines that the magnitude of the deficit angle 1106 is zero between the heel off movement phase 412 and the initial swing movement phase 416 and thus the module 150 does not identify an angle deficit between the heel off movement phase 412 and the initial swing movement phase 416.

In step 1205, the module 150 determines the movement phase with a primary angle deficit 1106 that has the largest magnitude of the identified angle deficits 1106 in step 1203. In an example embodiment, in step 1203 the module 150 determined that the angle deficits 1106 are 5 degrees, 6 degrees and 7 degrees during respective movement phases A, B and C. In step 1205, the module 150 determines that movement phase C is the primary angle deficit 1106, with the largest magnitude of 7 degrees. In one embodiment, the module 150 is configured to only cause the controller to transmit a torque signal to the motor 314 during the movement phase of the primary angle deficit 1106 identified in step 1205 until the magnitude of the angle deficit 1106 in the movement phase of the primary angle deficit is reduced by a predetermined amount.

Figure 13:
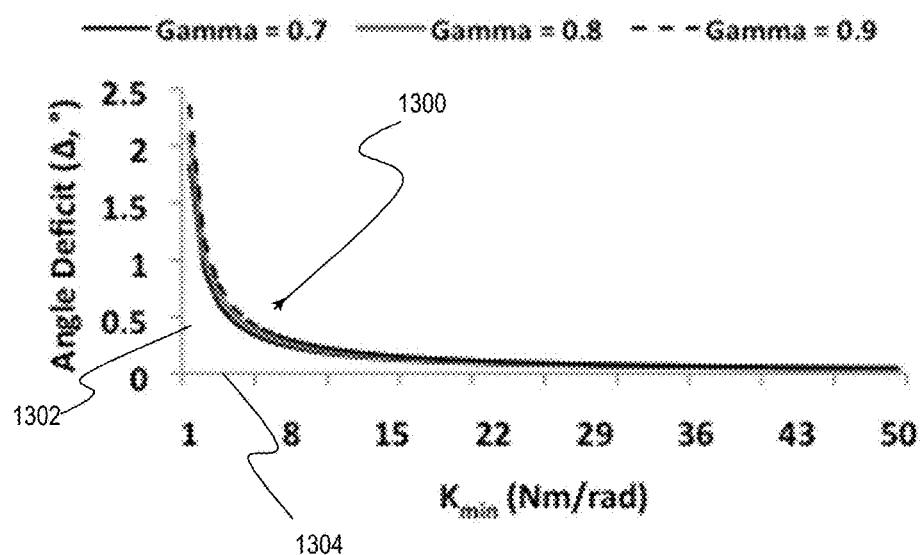
FIG. 13 is a graph that illustrates an example of a parameterized deficit angle trace based on a minimum stiffness parameter, according to an embodiment.

In step 1207, the module 150 parameterizes the angle deficit 1106 during each movement phase identified in step 1203, based on the movement models for each movement phase. In an example embodiment, for an angle deficit 1106 between the initial and terminal swing phases 416, 418, in step 1207, the module 150 uses the minimum stiffness parameter $K_{min}$ calculated using Equation 2 in step 907 in the method 900 or determined using the "look-up" trace 1000 of FIG. 10 to parameterize the deficit angle 1106. Equation 2 may be re-written as Equation 3:

$$\Delta = \frac{\theta_d K_h \gamma}{K_{min}} \quad (3)$$

where $\Delta$ is the parameterized angle deficit 906, based on the minimum stiffness parameter $K_{min}$. Equation 3 of the movement model between the initial and terminal swing phases 416, 418 explicitly links the parameterized deficit angle $\Delta$ to the minimum stiffness parameter $K_{min}$. For a chosen value of $\gamma$, the parameterized deficit angle $\Delta$ is inversely proportional to the minimum stiffness parameter $K_{min}$. FIG. 13 is a graph that illustrates an example of a parameterized deficit angle trace 1300 based on the minimum stiffness parameter $K_{min}$, according to an embodiment. The deficit angle trace 1300 is measured against a vertical axis 1302 of values of the parameterized angle deficit $\Delta$ and is plotted against a horizontal axis 1304 of values of the minimum stiffness parameter $K_{min}$. As illustrated in FIG. 13, a respective trace 1300 is provided for various values of the ratio $\gamma$, such as 0.7, 0.8 and 0.9. Thus, step 1207 for the movement phase between the initial and terminal swing phases 416, 418 involves determining the minimum stiffness parameter $K_{min}$ and then determining the parameterized angle deficit $\Delta$ either using Equation 3 or using the "look up" table of digital data based on trace 1300. The parameterized angle deficit determined in step 1207 is used to initialize the anklebot 300, from which the stiffness value K is varied over time, based on actual performance and historical time of recovery.

To perform 1207 for the movement model between the heel strike movement phase 408 and the mid stance movement phase 410, after identifying the angle deficit 1106 between the movement phases 408, 410, the controller 140 determines a deficit torque $\Delta\tau$ that is a difference between a desired torque $\tau_d$ and a measured torque $\tau$ between the heel strike movement phases 408 and the mid stance movement phase 410. In an embodiment, the desired torque $\tau_d$ of a normal subject and a measured torque $\tau$ of an impaired subject between the heel strike movement phases 408 and the mid stance movement phase 410 were measured by the torque sensor (e.g. motor 314) during steps 203, 205 and stored in a memory of the module 150. During step 1207, the module 150 uses the minimum damping parameter $b_{min}$ calculated using Equation 1 in step 707 in the method 700 or determined using the "look-up" trace 800 of FIG. 8 to parameterize the deficit torque $\Delta\tau$ between the movement phases 408, 410. Equation 1 may be re-written as Equation 4.

$$\Delta\tau \leq b_{min}(V_m - v_{HS}) + \tau_d - C \quad (4)$$

where $\Delta\tau$ is the parameterized deficit torque between the movement phases 408, 410, $\tau_d$ is the desired torque between the movement phases 408, 410 and C is $\alpha g M H \varphi$ from Equation 1. The movement model between the movement phases 408, 410 explicitly links deficit torque $\Delta\tau$ to the minimum damping parameter $b_{min}$. For a chosen value of $V_m$, the deficit torque $\Delta\tau$ is directly proportional to the minimum damping parameter $b_{min}$.

Figure 14:
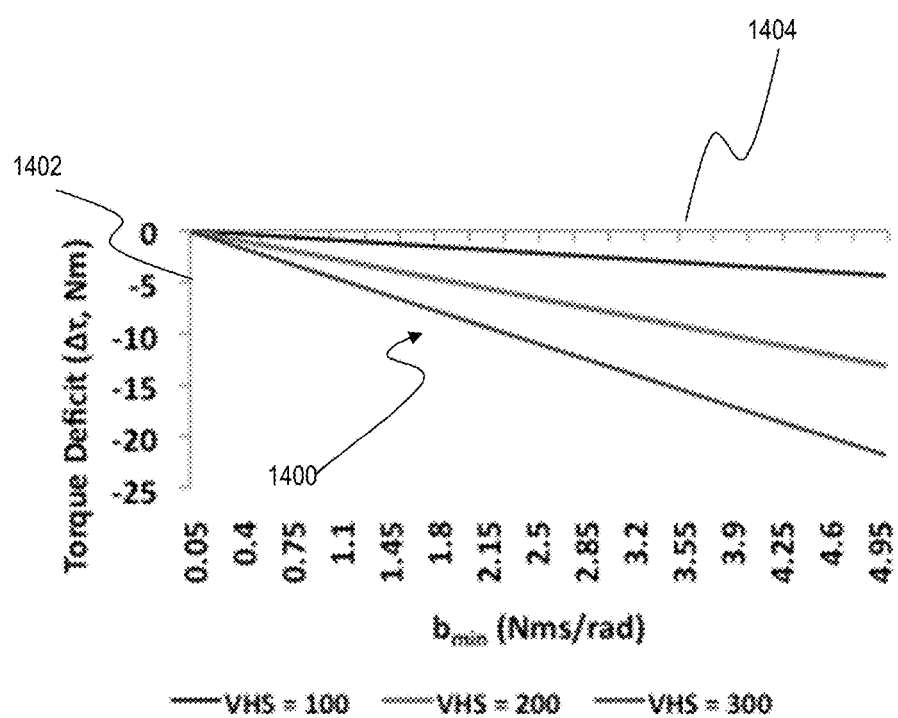
FIG. 14 is a graph that illustrates an example of a parameterized deficit torque trace based on a minimum damping parameter, according to an embodiment.

FIG. 14 is a graph that illustrates an example of a parameterized deficit torque traces 1400a, 1400b, 1400c based on the minimum damping parameter $b_{min}$, according to an embodiment The deficit torque traces 1400a, 1400b, 1400c are measured against a vertical axis 1402 of values of the parameterized torque deficit $\Delta\tau$ and are plotted against a horizontal axis 1404 of values of the minimum damping parameter $b_{min}$. As illustrated in FIG. 14, respective traces 1400a, 1400b, 1400c are provided for various values of the maximum angular velocity ($v_{HS}$). In an example embodiment, the trace 1400a corresponds to a value of 100°/sec for $v_{HS}$; the trace 1400b corresponds to a value of 200°/sec for $v_{HS}$; and the trace 1400c corresponds to a value of 300°/sec for $v_{HS}$. Thus, step 1207 for the movement phase between the heel strike movement phase 408 and mid stance movement phase 410 involves determining the minimum damping parameter $b_{min}$ and then determining the parameterized torque deficit $\Delta\tau$ either using Equation 4 or using a digital "look up" table based on traces 1400a, 1400b, 1400c. The parameterized torque deficit determined in step 1207 is used to initialize the anklebot 300, from which to the damping value b is varied over time, based on actual performance and historical time of recovery.

Figure 15:
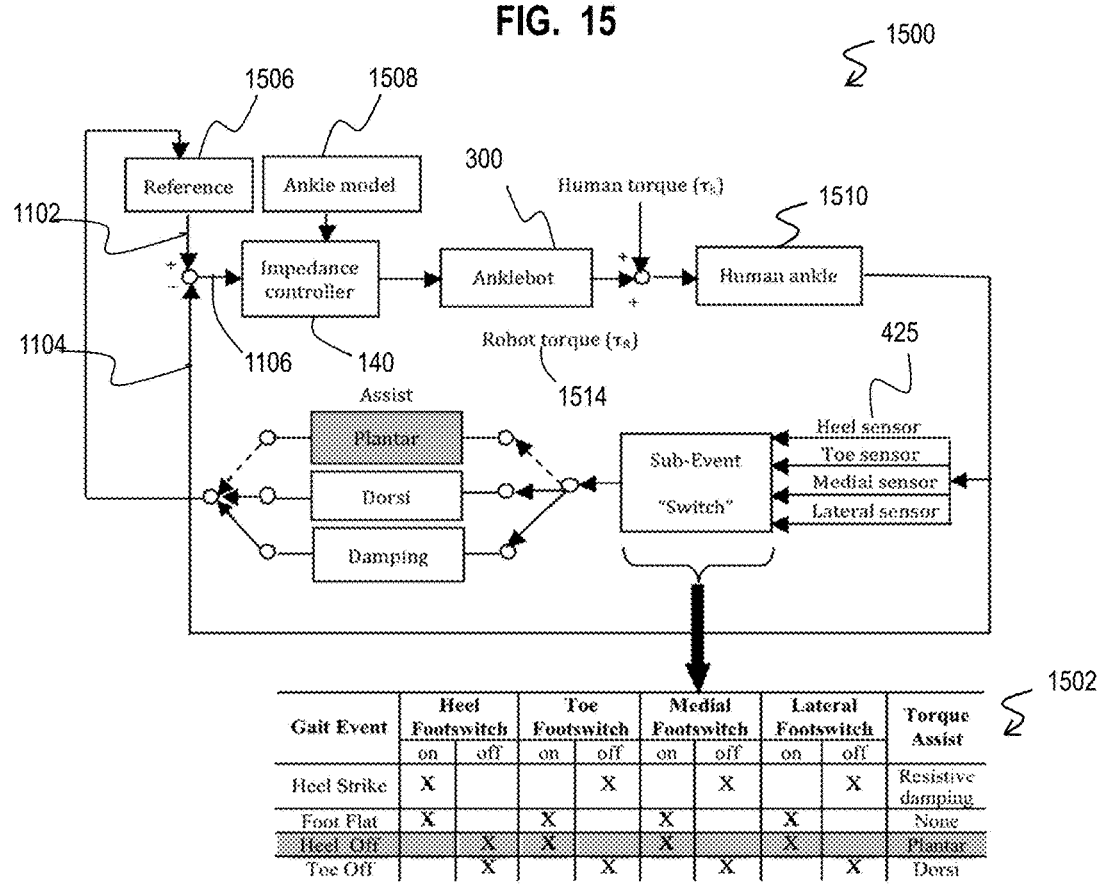
FIG. 15 is a block diagram that illustrates an example system for providing deficit-adjusted adaptive assistance during a plurality of movement phases of an impaired ankle joint, according to an embodiment.

FIG. 15 is a block diagram that illustrates an example drive module 1500 for providing deficit-adjusted adaptive assistance during a plurality of movement phases of an impaired ankle joint, according to an embodiment. Drive module 1500 is a specific embodiment of module 150, but does not include human ankle 1510. During operation of module 1500, the impaired subject wears the anklebot 300 and moves the subject's ankle 1510 through a plurality of movement phases. The human ankle 1510 imparts pressure on one or more of the footswitches 425, which transmit the collective voltage 420 output to the module 1500. Based on the method 500 of FIG. 5, the module 1500 predetermined the movement phase of the gait cycle 300 that corresponds to each collective footswitch output, and this predetermined relationship is depicted in table 1502. Based on the collective voltage 420 output of the footswitches 425, the module 1500 determines the current movement phase of the gait cycle 300. As discussed above, the module 1500 stored the ankle trace 1102 of a normal subject and the angle trace 1104 of the impaired subject in a memory, which is depicted as reference module 1506 in FIG. 15. As the subject walks through each movement phase, the module 1500 retrieves the stored angle trace 1102 value, angle trace 1104 value and the deficit angle 1106 corresponding to the current movement phase from the reference module 1506.

In an example embodiment, instead of the angle trace values 1102, 1104 and the angle deficit 1106, the module 1500 may retrieve torque trace values of the normal subject and impaired subject and the deficit torque of the current movement phase that are stored in the memory of the module 1500.

To perform step 209 of the method 200, the adaptive timing for the anklebot applied torque 1514 is determined for a current movement phase by the module 150 based on the current voltage 420 output of the footswitches 425. In the example embodiment of FIG. 15, the module 1500 determined that the current voltage 420 output of the footswitches 425 indicates that the current movement phase is the heel off movement phase 412. The module 1500 uses the reference module 1506 to determine whether the magnitude of the angle deficit 1106 in the current movement phase is zero (or less than a minimum threshold). If the module 1500 determines that the magnitude of the angle deficit 906 is zero (or less than the minimum threshold) in the current movement phase, the module 1500 does not transmit an applied torque signal to the motor 314 during the current movement phase. If the module 1500 determines that the magnitude of the angle deficit 1106 in the current movement phase is greater than zero (or the minimum threshold), the module 1500 transmits an applied torque signal to the anklebot 300, e.g., motor 314, during the current movement phase.

To perform step 211, the adaptive magnitude for the anklebot applied torque 1514 is determined for a current movement phase by the module 1500. The adaptive magnitude of the anklebot applied torque 1514 is provided by Equation 5

$$\tau_R = K\Delta + B\frac{d}{dt}(\Delta) \quad (5)$$

where $\tau_R$ is the anklebot applied torque 1514; K is the stiffness setting of the controller 140; Δ is the angle deficit 1106 for the current movement phase and B is a damping setting of the controller 140. The stiffness setting K and damping setting B of the controller 140 are initially set to the respective minimum stiffness setting $K_{min}$ and the minimum damping setting $b_{min}$ determined from Equations 1 and 2. As discussed in step 1207, the polarity and magnitude of the angle deficit 1106 are predetermined for each movement phase and stored in a memory of the module 1500 (e.g. reference module 1506). Since the polarity of the angle deficit 1106 is positive between the initial and terminal swing phases 416, 418 and between the heel off movement phase 412 and the toe off movement phase 414, the resulting anklebot applied torque 1514 from Equation 5 is assistive during these movement phases. Since the polarity of the angle deficit 1106 is negative between the heel strike movement phase 408 and the mid stance movement phase 410, the resulting anklebot applied torque 1514 from Equation 5 is restorative during these movement phases.

In an example embodiment, the module 1500 uses the method 900 of FIG. 9 and Equation 2 to determine the minimum stiffness parameter $K_{min}$, which is then used to parameterize the adaptive magnitude of the applied torque 1514 during the current movement phase between the initial and terminal swing phases 416, 418. By substituting the angle deficit $\Delta=\theta_d-\theta$ into Equation 5, the following Equation 6 is obtained:

$$\tau_R = K(\theta_d - \theta) + \frac{d}{dt}(\theta_d - \theta) \quad (6)$$

where $\theta_d$ is the desired angle and $\theta$ is the measured angle between the initial and terminal swing phases 416, 418. Since $\theta_d$ is the desired peak angle between the initial and terminal swing phases 416, 418 (see FIG. 11), the time derivative of $\theta_d$ is zero. The time derivative of the measured angle $\theta$ between the initial and terminal swing phases 416, 418 is $v_\theta$, the measured ankle angular velocity. Additionally, to attain the desired ratio γ of the desired peak angle $\theta_d$, K is set to the value of the minimum stiffness parameter $K_{min}$ from Equation 2. Based on these assumptions, Equation 6 becomes:

$$\tau_R = K_{min}\Delta + Bv_\theta = \theta_d K_h \gamma + Bv_\theta \quad (7)$$

where B is a damping held constant (in a range of 0.5-1.0 Nms/rad) When the current movement phase is between the initial and terminal swing phases 416, 418, and the controller 140 identifies an angle deficit during this current movement phase (i.e. step 1203), the module 1500 parameterizes the anklebot imparted torque 1514 based on Equation 7.

In an example embodiment, the module 1500 uses the method 700 of FIG. 7 and Equation 1 to determine the minimum damping parameter $b_{min}$, which is then used to parameterize the adaptive magnitude of the applied torque 1514 during a current movement phase between the heel strike movement phase 408 and mid stance movement phase 410. In contrast to the movement model between the swing phases 416, 418, the torques predicted by the model between the heel strike movement phase 408 and the mid stance movement phase 410 is by nature, "springy" restorative (for shock absorption of abnormally high impact forces due to "foot slap" resulting from foot drop deficit). The mode of application of the model between the movement phases 408, 410 initially sets the controller 140 stiffness K to 0 Nm/rad, and thus it follows from Equation 5 that the torque is given by Equation 8.

$$\tau_R = B\frac{d}{dt}(\Delta) \quad (8)$$

In Equation 8, the damping setting B of the module 1500 is set to $b_{min}$ and using Equation 1, so Equation 9 is obtained:

$$\tau_R = b_{min}v_\theta = \frac{\alpha g M H \phi}{V_m - v_{HS}} \quad (9)$$

When the current movement phase is between the heel strike movement phase 408 and the mid stance movement phase 410, and the module 1500 identifies an angle deficit during this current movement phase (e.g., in step 1203), the module parameterizes the anklebot imparted torque 1514 based on Equation 9.

To perform step 213, the adaptive magnitude of the anklebot applied torque 1514, as determined by one or more of Equations 5 through 9, is applied by the motor 314 on the shoe 302 for the current movement phase, based on the adaptive timing for the current movement phase. During step 213, the module 1500 transmits the adaptive magnitude data for the applied torque 1514 for the current movement phase to the motor 314, based on the adaptive timing for the current movement phase from step 209. Upon receiving the adaptive magnitude data from the module 1500, the motor 314 imparts the applied torque with the adaptive magnitude on the shoe 302 during the current movement phase. Steps 215, 217, 219, 221 are performed in the example embodiment of the anklebot in a similar manner as in the method 200 discussed above.

Figure 16:
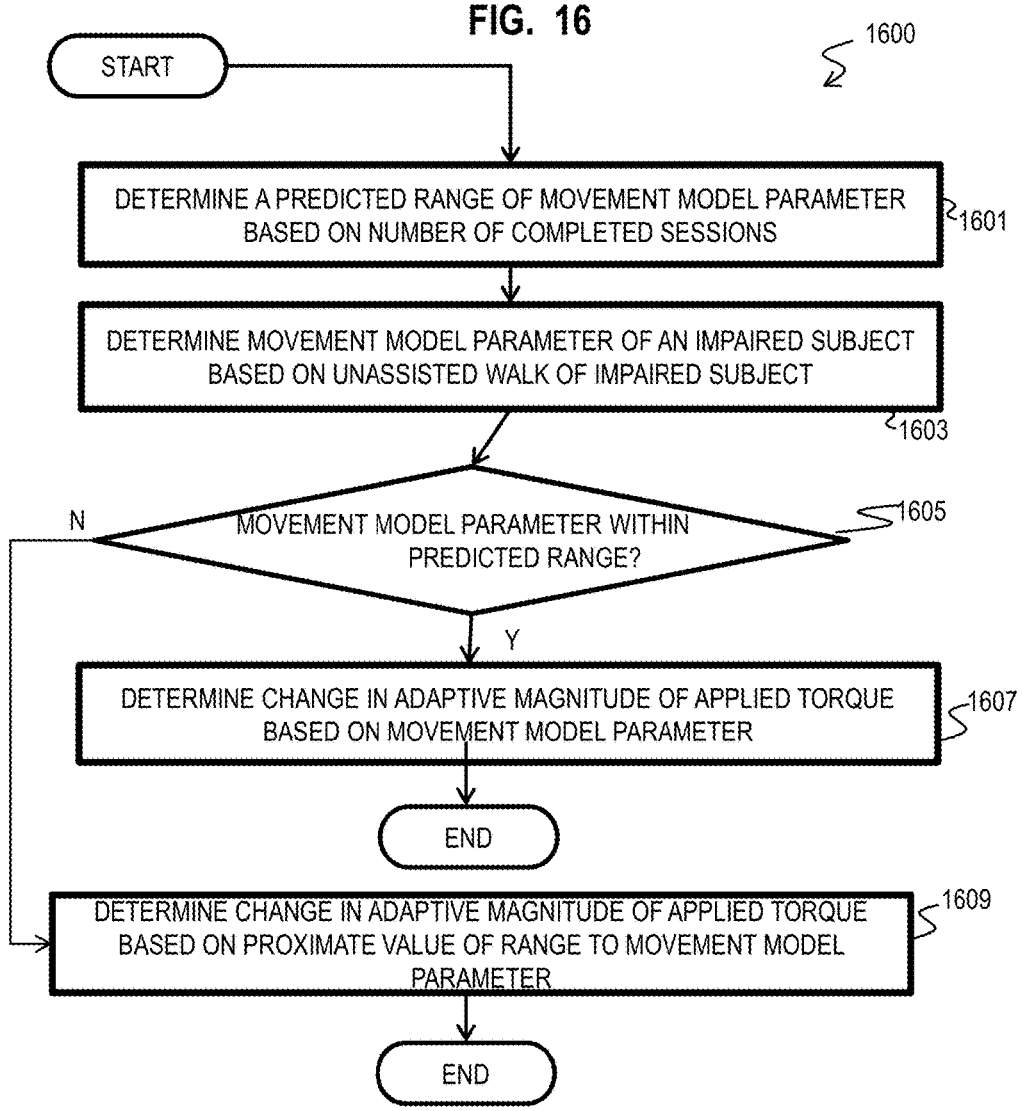
FIG. 16 is a flow diagram that illustrates an example of a method for predicting a change in the adaptive magnitude of the applied torque in each movement phase.

In step 223, a prediction in the change of the adaptive magnitude of the applied torque 1114 is made by the module 150 for each movement phase. FIG. 16 is a flow diagram that illustrates an example of a method 1600 for predicting a change in the adaptive magnitude of the applied torque 1514 in each movement phase.

In step 1601, the module 150 determines a predicted range of the movement model parameter for each movement phase, based on the number of completed sessions. In an example embodiment, the predicted range of the minimum stiffness parameter $K_{min}$ is 125-150 Nm/rad for the first 3 sessions, 150-200 Nm/rad for the next 6 sessions and 75-125 Nm/rad thereafter. In an example embodiment, the predicted range of the minimum damping parameter $b_{min}$ is 3-4 Nms/rad for the first 3 sessions, 2-3 Nms/rad for the next 6 sessions and 1.1.5 Nms/rad thereafter.

In step 1603, the impaired subject wears the anklebot 300 during an unassisted walking session, and the module 150 receives torque data from the motor 314, position or angle data from the sensor 313 and voltage 420 output data from the footswitches 425. Based on the methods 700, 900, the module 150 uses the measured position data to recalculate the movement model parameter for each movement phase.

In step 1605, the module 150 compares the recalculated movement model parameter from step 1603 with the predicted range of the movement model parameter from step 1601. In an example embodiment, if the module 150 recalculates a minimum stiffness parameter $K_{min}$ of 145 Nm/rad in step 1603 and determines a predicted range of 125-150 Nm/rad in step 1601, the module 150 determines that the recalculated movement model parameter is within the predicted range and proceeds to step 1607. If the module 150 determines that the recalculated movement model parameter is not within the predicted range, the method 1600 proceeds to step 1609.

In step 1607, the module 150 uses the recalculated movement model parameter in step 1603 to determine a change in the adaptive magnitude of the applied torque 1514, as in step 211. In step 1609, the module 150 uses a proximate value of the predicted range to the movement model parameter to determine a change in the adaptive magnitude of the applied torque 1514. In an example embodiment, if the module 150 calculates a minimum stiffness parameter $K_{min}$ of 170 Nm/rad in step 1603 and determines a predicted range of 125-150 Nm/rad in step 1601, then in step 1609 the module 150 determines that the maximum range value of 150 Nm/rad is the most proximate value to the recalculated minimum stiffness parameter of 170 Nm/rad and thus the module 150 uses the proximate value of 150 Nm/rad parameter to determine a change in the adaptive magnitude of the applied torque 1514, as in step 211.

Figure 17:
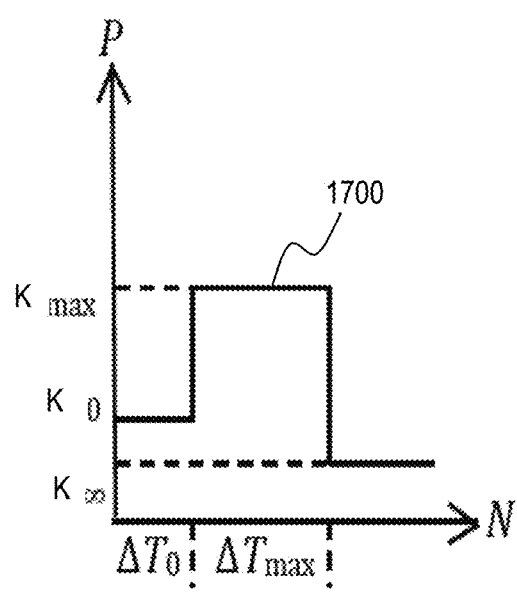
FIG. 17 is an example of a trace of the minimum stiffness parameter over a number of physical therapy sessions, according to an embodiment.

FIG. 17 is a graph that illustrates an example of a trace 1700 of the minimum stiffness parameter $K_{min}$ over a number of physical therapy sessions, according to an embodiment. In the embodiment of FIG. 17, during a first period of physical therapy $\Delta T_0$ which includes 1-3 sessions, the minimum stiffness parameter $K_{min}$ is adjusted to a value $K_0$ within the range of 125-150 Nm/rad. During a second period of physical therapy $\Delta T_{max}$ which includes 6-9 sessions, the minimum stiffness parameter $K_{min}$ is adjusted to a value $K_{max}$ within the range of 150-200 Nm/rad. During a third period of physical therapy beyond $\Delta T_{max}$ the minimum stiffness parameter is adjusted to a value $K_\infty$ within a range of 75-125 Nm/rad. Step 223 of the method 200 may be performed by choosing the value within the range of the movement model parameter, and subsequently determining the change in the adaptive magnitude of the applied torque in each movement phase using one or more of Equations 5 through 9, based on this change in the movement model parameter.

Figure 18:
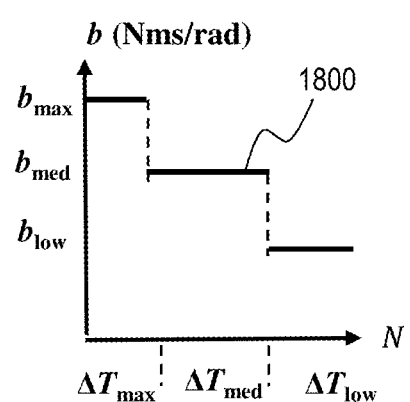
FIG. 18 is a graph that illustrates an example of a trace of the minimum damping parameter over a number of physical therapy sessions, according to an embodiment.

FIG. 18 is a graph that illustrates an example of a trace 1800 of the minimum damping parameter $b_{min}$ over a number of physical therapy sessions, according to an embodiment. In the embodiment of FIG. 18, during a first period of physical therapy $\Delta T_{max}$ which includes 1-3 sessions, the minimum damping parameter $b_{min}$ is adjusted to a maximum value $b_{max}$ within the range of 3-4 Nms/rad. During a second period of physical therapy $\Delta T_{med}$ which includes 6-9 sessions, the minimum damping parameter $b_{min}$ is adjusted to a value $b_{med}$ within the range of 2-3 Nms/rad. During a third period of physical therapy beyond $\Delta T_{low}$ the minimum damping parameter is adjusted to a value $b_{low}$ within a range of 1-1.5 Nms/rad. Step 223 of the method 200 may be performed by choosing the value within the range of the movement model parameter, and subsequently determining the change in the adaptive magnitude of the applied torque in each movement phase, using one or more of Equations 5 through 9, based on this change in the movement model parameter.

B. Amputation Prostheses

In an embodiment, the invention is utilized in the context of amputation prostheses that is designed to replace lost limbs in a patient, to help the patient recover mobility and sensory function. In particular, leg prostheses provide mechanical support, shock absorption, balance, and forward propulsion. An example embodiment of the invention provides functionality regarding assistance and resistance during movement phases of leg prostheses. In an example embodiment, battery-powered motorized amputation prostheses that utilize the adaptive timing and adaptive magnitude for adaptive assistance can be utilized to advance the field of active amputation prostheses. Also, in an example embodiment, adaptive timing of resistance to lower limb amputation prostheses helps manage collisions between the foot and the ground. In an example embodiment, adaptive magnitude of resistance as informed by landing model can also be used in leg prostheses.

C. Training Healthy Joints

In "Measurement of human ankle stiffness using the Anklebot," *ICORR* 2007, *IEEE 10th International Conference on Rehabilitation Robotics*, June 2007, pp. 356-363 and "Measurement of Passive Ankle Stiffness in Subjects with Chronic Hemiparesis Using a Novel Ankle Robot." *J Neurophysiol* 105:2132-2149, 2011, both of which are incorporated by reference as if fully recited herein, the inventors demonstrated that motion of the ankle from side to side is actually independent of motion of the ankle up and down. Moreover, when moved passively, the ankle is weakest when turning inward, stronger when tilting from side to side, and strongest when simply moving up and down, demonstrating highly anisotropic (e.g. direction dependent) passive mechanical impedance. In an example embodiment of the invention, these teachings can be applied to train healthy people to exercise their ankles in specific ways that strengthen them and help reduce future injuries. In this example embodiment, the invention is used for human performance augmentation of lower limb joints including the ankle. This example embodiment may also lead to mechanical footwear that provide scaled and timed resistance in lateral (e.g. side to side) foot motion for stability while providing timed assistance for up-down motion.

D. Regulating Foot Pressure and Ground Reaction Forces in Diabetic Neuropathy

In some embodiments, one or more steps of the above methods are used in the context of regulating foot pressure and ground reaction forces in diabetic neuropathy. Approximately 9.3% of people have diabetes mellitus type 2, including 26% of individuals over 65 years of age. A substantial portion of these people will develop peripheral neuropathy that leads to reduced sensation, particularly in the toes and feet. This is followed by intrinsic foot muscle wasting and secondary orthopedic problems consisting of hammer toes, Charcot Joints, lateral toe deviations, and thinning of the metatarsal pads. All of these conditions, combined with the insensate foot, lead to foot ulcers, which produce a 50% five year survival curve, as they are only treatable with "static orthotics" to better distribute the foot pressure forces. In one example embodiment, the movement model of the invention employed between the heel strike movement phases 408 and the mid stance movement phase 410 of the gait cycle 400 (i.e. "foot slap") may be utilized to impart restorative torque on the subject's shoe and thus enable precise timing of impulse, or ground reaction forces that are seen by the toes and foot, thereby enabling a dynamic real time control of the pressures that lead to foot ulcers, and exacerbate ulcers. Additionally, the progression elements of the movement model between the movement phases 408, 410 afforded by the invention produce motor learning during ambulatory conditions, which affords inroads in the fields of podiatry and orthotics for the care of diabetic neuropathy, and other neuropathies such as peripheral arterial occlusive disease, yielding new therapies to reduce foot damage, prevent ulcers, and ultimately prevent amputations.

E. Motor Learning to Improve Outcomes for Podiatry, Orthopedics, and Prosthetics Some embodiments are utilized in the context of motor learning to improve outcomes for podiatry, orthopedics, and prosthetics. Selected post-operative care conditions in podiatry and orthopedics could optimize outcomes if ground reaction forces (impulse) were controlled for safety, and if progressive motor learning were optimized in the post-operative rehabilitative recovery period. These embodiments offer the control systems in a deficit adjusted manner to meet these needs. In the field of prosthetics, the ground reaction forces (impulse) are conducted up the prosthetic shank, and over many years, repetitive use and pounding can cause pain and complications at the stump. The movement model of embodiments employed between the heel strike movement phases 408 and the mid stance movement phase 410 of the gait cycle 400 (i.e. "foot slap") may be utilized to produce a bio-inspired walking pattern utilizing the adaptive controller in a deficit severity adjusted manner, with machine learning to adapt the underlying prosthetic device to cushion the stump can be used to improve outcomes in prosthetics. For those with polytrauma, and subsequent tibialis anterior (e.g. swing phase deficit) or peroneal nerve damage with foot eversion weakness, or stance phase deficit due to lumbar 5 sacral 1 or sciatic trunk or incomplete tract injury, the modular deficit severity adjustable units can be adapted to serve as a task-oriented functional mobility therapeutic tool to extend the therapists capabilities. This would enable precise mathematical modelling for optimization of progression that would serve as a cumulative repository for assisting and informing the recovery of future similar polytrauma and orthopedic or mixed neurological-orthopedic cases.

3. Hardware Overview

FIG. 19 is a block diagram that illustrates a computer system 1900 upon which an embodiment of the invention may be implemented. Computer system 1900 includes a communication mechanism such as a bus 1910 for passing information between other internal and external components of the computer system 1900. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1900, or a portion thereof, constitutes a means for performing one or more steps of one or more methods described herein.

A sequence of binary digits constitutes digital data that is used to represent a number or code for a character. A bus 1910 includes many parallel conductors of information so that information is transferred quickly among devices coupled to the bus 1910. One or more processors 1902 for processing information are coupled with the bus 1910. A processor 1902 performs a set of operations on information. The set of operations include bringing information in from the bus 1910 and placing information on the bus 1910. The set of operations also typically include comparing two or more units of information, shifting positions of units of information, and combining two or more units of information, such as by addition or multiplication. A sequence of operations to be executed by the processor 1902 constitute computer instructions.

Computer system 1900 also includes a memory 1904 coupled to bus 1910. The memory 1904, such as a random access memory (RAM) or other dynamic storage device, stores information including computer instructions. Dynamic memory allows information stored therein to be changed by the computer system 1900. RAM allows a unit of information stored at a location called a memory address to be stored and retrieved independently of information at neighboring addresses. The memory 1904 is also used by the processor 1902 to store temporary values during execution of computer instructions. The computer system 1900 also includes a read only memory (ROM) 1906 or other static storage device coupled to the bus 1910 for storing static information, including instructions, that is not changed by the computer system 1900. Also coupled to bus 1910 is a non-volatile (persistent) storage device 1908, such as a magnetic disk or optical disk, for storing information, including instructions, that persists even when the computer system 1900 is turned off or otherwise loses power.

Information, including instructions, is provided to the bus 1910 for use by the processor from an external input device 1912, such as a keyboard containing alphanumeric keys operated by a human user, or a sensor. A sensor detects conditions in its vicinity and transforms those detections into signals compatible with the signals used to represent information in computer system 1900. Other external devices coupled to bus 1910, used primarily for interacting with humans, include a display device 1914, such as a cathode ray tube (CRT) or a liquid crystal display (LCD), for presenting images, and a pointing device 1916, such as a mouse or a trackball or cursor direction keys, for controlling a position of a small cursor image presented on the display 1914 and issuing commands associated with graphical elements presented on the display 1914.

In the illustrated embodiment, special purpose hardware, such as an application specific integrated circuit (IC) 1920, is coupled to bus 1910. The special purpose hardware is configured to perform operations not performed by processor 1902 quickly enough for special purposes. Examples of application specific ICs include graphics accelerator cards for generating images for display 1914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1900 also includes one or more instances of a communications interface 1970 coupled to bus 1910. Communication interface 1970 provides a two-way communication coupling to a variety of external devices that operate with their own processors, such as printers, scanners and external disks. In general the coupling is with a network link 1978 that is connected to a local network 1980 to which a variety of external devices with their own processors are connected. For example, communication interface 1970 may be a parallel port or a serial port or a universal serial bus (USB) port on a personal computer. In some embodiments, communications interface 1970 is an integrated services digital network (ISDN) card or a digital subscriber line (DSL) card or a telephone modem that provides an information communication connection to a corresponding type of telephone line. In some embodiments, a communication interface 1970 is a cable modem that converts signals on bus 1910 into signals for a communication connection over a coaxial cable or into optical signals for a communication connection over a fiber optic cable. As another example, communications interface 1970 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1970 sends and receives electrical, acoustic or electromagnetic signals, including infrared and optical signals, that carry information streams, such as digital data.

The term computer-readable medium is used herein to refer to any medium that participates in providing information to processor 1902, including instructions for execution. Such a medium may take many forms, including, but not limited to, non-volatile media, volatile media and transmission media. Non-volatile media include, for example, optical or magnetic disks, such as storage device 1908. Volatile media include, for example, dynamic memory 1904. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1902, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1902, except for carrier waves and other signals.

Logic encoded in one or more tangible media includes one or both of processor instructions on a computer-readable storage media and special purpose hardware, such as ASIC *1920.

Network link 1978 typically provides information communication through one or more networks to other devices that use or process the information. For example, network link 1978 may provide a connection through local network 1980 to a host computer 1982 or to equipment 1984 operated by an Internet Service Provider (ISP). ISP equipment 1984 in turn provides data communication services through the public, world-wide packet-switching communication network of networks now commonly referred to as the Internet 1990. A computer called a server 1992 connected to the Internet provides a service in response to information received over the Internet. For example, server 1992 provides information representing video data for presentation at display 1914.

The invention is related to the use of computer system 1900 for implementing the techniques described herein. According to one embodiment of the invention, those techniques are performed by computer system 1900 in response to processor 1902 executing one or more sequences of one or more instructions contained in memory 1904. Such instructions, also called software and program code, may be read into memory 1904 from another computer-readable medium such as storage device 1908. Execution of the sequences of instructions contained in memory 1904 causes processor 1902 to perform the method steps described herein. In alternative embodiments, hardware, such as application specific integrated circuit 1920, may be used in place of or in combination with software to implement the invention. Thus, embodiments of the invention are not limited to any specific combination of hardware and software.

The signals transmitted over network link 1978 and other networks through communications interface 1970, carry information to and from computer system 1900. Computer system 1900 can send and receive information, including program code, through the networks 1980, 1990 among others, through network link 1978 and communications interface 1970. In an example using the Internet 1990, a server 1992 transmits program code for a particular application, requested by a message sent from computer 1900, through Internet 1990, ISP equipment 1984, local network 1980 and communications interface 1970. The received code may be executed by processor 1902 as it is received, or may be stored in storage device 1908 or other non-volatile storage for later execution, or both. In this manner, computer system 1900 may obtain application program code in the form of a signal on a carrier wave.

Various forms of computer readable media may be involved in carrying one or more sequence of instructions or data or both to processor 1902 for execution. For example, instructions and data may initially be carried on a magnetic disk of a remote computer such as host 1982. The remote computer loads the instructions and data into its dynamic memory and sends the instructions and data over a telephone line using a modem. A modem local to the computer system 1900 receives the instructions and data on a telephone line and uses an infra-red transmitter to convert the instructions and data to a signal on an infra-red a carrier wave serving as the network link 1978. An infrared detector serving as communications interface 1970 receives the instructions and data carried in the infrared signal and places information representing the instructions and data onto bus 1910. Bus 1910 carries the information to memory 1904 from which processor 1902 retrieves and executes the instructions using some of the data sent with the instructions. The instructions and data received in memory 1904 may optionally be stored on storage device 1908, either before or after execution by the processor 1902.

FIG. 20 illustrates a chip set 2000 upon which an embodiment of the invention may be implemented. Chip set 2000 is programmed to perform one or more steps of a method described herein and includes, for instance, the processor and memory components described with respect to FIG. 20 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 2000, or a portion thereof, constitutes a means for performing one or more steps of a method described herein.

In one embodiment, the chip set 2000 includes a communication mechanism such as a bus 2001 for passing information among the components of the chip set 2000. A processor 2003 has connectivity to the bus 2001 to execute instructions and process information stored in, for example, a memory 2005. The processor 2003 may include one or more processing cores with each core configured to perform independently. A multi-core processor enables multiprocessing within a single physical package. Examples of a multi-core processor include two, four, eight, or greater numbers of processing cores. Alternatively or in addition, the processor 2003 may include one or more microprocessors configured in tandem via the bus 2001 to enable independent execution of instructions, pipelining, and multithreading. The processor 2003 may also be accompanied with one or more specialized components to perform certain processing functions and tasks such as one or more digital signal processors (DSP) 2007, or one or more application-specific integrated circuits (ASIC) 2009. A DSP 2007 typically is configured to process real-world signals (e.g., sound) in real time independently of the processor 2003. Similarly, an ASIC 2009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 2003 and accompanying components have connectivity to the memory 2005 via the bus 2001. The memory 2005 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 2005 also stores the data associated with or generated by the execution of one or more steps of the methods described herein.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items. elements or steps. Furthermore, the indefinite article "a" or "an" is meant to indicate one or more of the item, element or step modified by the article.

What is claimed is:

1. A method comprising steps of:
   receiving, on a processor, sensor data from at least one sensor that indicates sensor state as a function of time based on movement of a joint of a normal subject or an impaired subject;
   determining, on the processor, a current movement phase of a plurality of movement phases for a compound joint function for the joint of the normal subject or the impaired subject based on a current sensor state from the sensor data;
   receiving, on the processor, robot state parameter data that indicates a robot state parameter of an exo-skeletal robot joint as a function of time;
   determining, on the processor, a robot state parameter trace for each movement phase in the normal subject based on the robot state parameter data and the sensor data from the normal subject;
   determining, on the processor, a robot state parameter trace for each movement phase in the impaired subject based on the robot state parameter data and the sensor data from the impaired subject;
   determining, on the processor, a deficit parameter for each movement phase based on a difference between the parameter trace for the normal subject and the parameter trace for the impaired subject;
   determining, on the processor, an adaptive timing for a robot applied torque based on the current movement phase based on the current sensor state from the sensor data;
   determining, on the processor, an adaptive magnitude for the robot applied torque based on the deficit parameter of the current movement phase; and
   applying, to the exo-skeletal robot joint, the adaptive magnitude for the robot applied torque for the current movement phase, based on the adaptive timing.

2. The method of claim 1, wherein the step of determining the deficit parameter for the current movement phase of the plurality of movement phases further comprises steps of determining a current value of a parameter of a movement model for the current movement phase and comparing the current value of the parameter with a threshold value of the parameter for the movement model of the current movement phase.

3. The method of claim 2, wherein the step of determining of the adaptive magnitude is further based on a difference between the current value of the parameter and the threshold value of the parameter for the movement model of the current movement phase.

4. The method of claim 1, further comprising steps of predicting a change in the deficit parameter based on a model of motor learning and determining a change in the adaptive magnitude based on the change in the deficit parameter.

5. The method of claim 1, further comprising steps of determining a change in the deficit parameter based on further determining the parameter trace for each movement phase in the impaired subject at a subsequent time and determining the adaptive magnitude based on the change in the deficit parameter.

6. The method of claim 1, wherein the step of determining the parameter trace for each movement phase in the normal subject comprises a step of retrieving from memory the parameter trace for each movement phase in the normal subject.

7. The method of claim 1, wherein the step of determining the parameter trace for each movement phase in the impaired subject comprises a step of retrieving from memory the parameter trace for each movement phase in the impaired subject.

8. The method of claim 1, wherein the exo-skeletal robot joint is an anklebot.

9. The method of claim 1, wherein the robot state parameter is an angle of the exo-skeletal robot joint as a function of time.

10. The method of claim 1, wherein the robot state parameter is a torque applied to the exo-skeletal joint as a function of time.

11. The method of claim 8, wherein the at least one sensor comprises a plurality of sensors and wherein the plurality of sensors comprises a plurality of footswitches.

12. The method of claim 11, wherein the plurality of footswitches are configured to detect pressure in a toe region, a heel region, a medial region and a lateral region of the foot.

13. The method of claim 2, wherein the phase for the movement model is a heel strike movement phase and the parameter is a maximum angular velocity.

14. The method of claim 2, wherein the phase for the movement model is a swing movement phase and the parameter is a peak swing angle.

15. The method of claim 1, wherein the step of determining the robot state parameter trace for each movement phase in the normal subject and the step of determining the robot state parameter trace for each movement phase in the impaired subject comprise a step of adjusting time axes of the robot state parameter trace in the normal subject and the robot state parameter trace in the impaired subject relative to each other so that the movement phase for each robot state parameter trace is aligned.

16. An apparatus comprising:
   at least one first sensor with a plurality of states based on a respective plurality of movement phases of a compound joint function;
   at least one second sensor configured to measure a respective robot state parameter of an exo-skeletal robot joint during each movement phase;
   at least one processor in communication with the at least one first sensor to receive the plurality of states and to the at least one second sensor to receive the respective robot state parameter of the subject;
   at least one memory including one or more sequence of instructions;
   the at least one memory and the one or more sequence of instructions configured to, with the at least one processor, cause the apparatus to perform at least the following;
      determine a deficit parameter for each movement phase based on the respective robot state parameter of the exo-skeletal robot joint of a normal subject and of an impaired subject;
      determine an adaptive timing for a robot applied torque based on a current movement phase based on a current state of the at least one first sensor;
      determine an adaptive magnitude for the robot applied torque based on the deficit parameter for the current movement phase; and
      apply, to the exo-skeletal robot joint, the adaptive magnitude for the robot applied torque for the current movement phase, based on the adaptive timing.

17. The apparatus of claim 16, wherein the robot state parameter is an angle of the exo-skeletal robot joint during each movement phase, wherein the at least one second sensor is an angle sensor configured to measure the angle of the exo-skeletal robot joint during each movement phase; wherein the adaptive magnitude for the robot applied torque is further based on a movement model of the current movement phase, wherein the movement model is based on a comparison of the measured angle of the exo-skeletal robot joint during the current movement phase with a threshold angle during the current movement phase.

18. The apparatus of claim 16, further comprising the exo-skeletal robot joint comprising:
   a pair of beams connected to a pivot configured to be coupled to, respectively, a limb and a body of a subject separated by a joint of the subject;
   a variable torque motor connected to the pivot;
   wherein the variable torque motor is in communication with the memory to receive the adaptive magnitude and the adaptive timing and is configured to impart the robot applied torque at the adaptive magnitude to the pivot during the current movement phase based on the adaptive timing.

19. The apparatus of claim 18, wherein the robot state parameter is a torque applied to the exo-skeletal joint during each movement phase, wherein the at least one second sensor is the variable torque motor configured to output torque data comprising a voltage or current in response to movement of the pair of beams around the pivot in response to external forces.

20. A non-transitory computer-readable medium carrying one or more sequences of instructions, wherein execution of the one or more sequences of instructions by one or more processors causes the one or more processors to perform the steps of:
   receiving sensor data that indicates sensor state as a function of time based on movement of a joint of an impaired subject or a normal subject;
   determining a current movement phase of a plurality of movement phases for a compound joint function for the joint of the impaired subject or the normal subject based on a current sensor state from the sensor data;
   receiving robot state parameter data that indicates a robot state parameter of an exo-skeletal robot joint as a function of time;
   determining a robot state parameter trace for each movement phase in the normal subject based on the robot state parameter data and the sensor data from the normal subject;
   determining a robot state parameter trace for each movement phase in the impaired subject based on the robot state parameter data and the sensor data from the impaired subject;
   determining a deficit parameter for each movement phase based on a difference between the robot state parameter trace for the normal subject and the robot state parameter trace for the impaired subject;
   determining an adaptive timing for a robot applied torque based on the current movement phase based on the current sensor state from the sensor data;
   determining an adaptive magnitude for the robot applied torque based on the deficit parameter of the current movement phase; and
   applying the adaptive magnitude for the robot applied torque for the current movement phase based on the adaptive timing.

* * * * *